US012632463B1

(12) United States Patent
Cheon et al.

(10) Patent No.: US 12,632,463 B1
(45) Date of Patent: May 19, 2026

(54) DATA STRUCTURE CONVERSION TO REDUCE AN AMOUNT OF PROCESSING BY A PROCESSOR IN A COMMUNICATION SYSTEM

(71) Applicant: Marvell Asia Pte Ltd, Singapore (SG)

(72) Inventors: Hyun Soo Cheon, San Jose, CA (US); Dennis Doidge, Apex, NC (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 18/791,235

(22) Filed: Jul. 31, 2024

Related U.S. Application Data

(60) Provisional application No. 63/603,634, filed on Nov. 28, 2023.

(51) Int. Cl.
G06F 16/25 (2019.01)
(52) U.S. Cl.
CPC ................................. G06F 16/258 (2019.01)
(58) Field of Classification Search
CPC .................................................. G06F 16/258
See application file for complete search history.

(56) References Cited

U.S. PATENT DOCUMENTS 5,974,416 A * 10/1999 Anand .................. G06F 16/258
709/203
2013/0176878 A1 * 7/2013 Lee ....................... H04W 24/02
370/252
2016/0150011 A1 * 5/2016 Le Nerriec .......... H04N 21/242
709/205

* cited by examiner

*Primary Examiner* — Cheyne D Ly

(57) ABSTRACT

A system includes a plurality of antennas that receive wireless data. A first memory component stores a first plurality of resource blocks and associated resource elements for the received data associated with a first antenna of the plurality of antennas in a first row of the first memory component. The first memory component stores the first plurality of resource blocks for a second antenna of the plurality of antennas in a second row of the first memory component. A conversion unit receives the stored first plurality of resource blocks from the first memory component and formats the stored first plurality of resource blocks and associated resource elements to arrange a first resource block of the first plurality of resource blocks from the first and the second antennas in a same row to form a formatted data. A second memory component is configured to store the formatted data.

21 Claims, 29 Drawing Sheets

Formatted Data
142

Stored Data
322

| | | | | | | | |
|---|---|---|---|---|---|---|---|
| rb_i-7 | rb_i-6 | rb_i-5 | rb_i-4 | rb_i-3 | rb_i-2 | rb_i-1 | rb_i-0 |
| rb_i-7 | rb_i-6 | rb_i-5 | rb_i-4 | rb_i-3 | rb_i-2 | rb_i-1 | rb_i-0 |
| rb_i-7 | rb_i-6 | rb_i-5 | rb_i-4 | rb_i-3 | rb_i-2 | rb_i-1 | rb_i-0 |
| rb_i-7 | rb_i-6 | rb_i-5 | rb_i-4 | rb_i-3 | rb_i-2 | rb_i-1 | rb_i-0 |
| rb_i-7 | rb_i-6 | rb_i-5 | rb_i-4 | rb_i-3 | rb_i-2 | rb_i-1 | rb_i-0 |
| rb_i-7 | rb_i-6 | rb_i-5 | rb_i-4 | rb_i-3 | rb_i-2 | rb_i-1 | rb_i-0 |
| rb_i-7 | rb_i-6 | rb_i-5 | rb_i-4 | rb_i-3 | rb_i-2 | rb_i-1 | rb_i-0 |
| rb_i-7 | rb_i-6 | rb_i-5 | rb_i-4 | rb_i-3 | rb_i-2 | rb_i-1 | rb_i-0 |

L0

| | | | | | | | |
|---|---|---|---|---|---|---|---|
| rb_i-7 | rb_i-6 | rb_i-5 | rb_i-4 | rb_i-3 | rb_i-2 | rb_i-1 | rb_i-0 |
| rb_i-7 | rb_i-6 | rb_i-5 | rb_i-4 | rb_i-3 | rb_i-2 | rb_i-1 | rb_i-0 |
| rb_i-7 | rb_i-6 | rb_i-5 | rb_i-4 | rb_i-3 | rb_i-2 | rb_i-1 | rb_i-0 |
| rb_i-7 | rb_i-6 | rb_i-5 | rb_i-4 | rb_i-3 | rb_i-2 | rb_i-1 | rb_i-0 |
| rb_i-7 | rb_i-6 | rb_i-5 | rb_i-4 | rb_i-3 | rb_i-2 | rb_i-1 | rb_i-0 |
| rb_i-7 | rb_i-6 | rb_i-5 | rb_i-4 | rb_i-3 | rb_i-2 | rb_i-1 | rb_i-0 |
| rb_i-7 | rb_i-6 | rb_i-5 | rb_i-4 | rb_i-3 | rb_i-2 | rb_i-1 | rb_i-0 |

L1

| | | | | | | | |
|---|---|---|---|---|---|---|---|
| rb_(i+1)-3 | rb_(i+1)-2 | rb_(i+1)-1 | rb_(i+1)-0 | rb_i-11 | rb_i-10 | rb_i-9 | rb_i-8 |
| rb_(i+1)-3 | rb_(i+1)-2 | rb_(i+1)-1 | rb_(i+1)-0 | rb_i-11 | rb_i-10 | rb_i-9 | rb_i-8 |
| rb_(i+1)-3 | rb_(i+1)-2 | rb_(i+1)-1 | rb_(i+1)-0 | rb_i-11 | rb_i-10 | rb_i-9 | rb_i-8 |
| rb_(i+1)-3 | rb_(i+1)-2 | rb_(i+1)-1 | rb_(i+1)-0 | rb_i-11 | rb_i-10 | rb_i-9 | rb_i-8 |
| rb_(i+1)-3 | rb_(i+1)-2 | rb_(i+1)-1 | rb_(i+1)-0 | rb_i-11 | rb_i-10 | rb_i-9 | rb_i-8 |
| rb_(i+1)-3 | rb_(i+1)-2 | rb_(i+1)-1 | rb_(i+1)-0 | rb_i-11 | rb_i-10 | rb_i-9 | rb_i-8 |
| rb_(i+1)-3 | rb_(i+1)-2 | rb_(i+1)-1 | rb_(i+1)-0 | rb_i-11 | rb_i-10 | rb_i-9 | rb_i-8 |
| rb_(i+1)-3 | rb_(i+1)-2 | rb_(i+1)-1 | rb_(i+1)-0 | rb_i-11 | rb_i-10 | rb_i-9 | rb_i-8 |

L0

| | | | | | | | |
|---|---|---|---|---|---|---|---|
| rb_(i+1)-3 | rb_(i+1)-2 | rb_(i+1)-1 | rb_(i+1)-0 | rb_i-11 | rb_i-10 | rb_i-9 | rb_i-8 |
| rb_(i+1)-3 | rb_(i+1)-2 | rb_(i+1)-1 | rb_(i+1)-0 | rb_i-11 | rb_i-10 | rb_i-9 | rb_i-8 |
| rb_(i+1)-3 | rb_(i+1)-2 | rb_(i+1)-1 | rb_(i+1)-0 | rb_i-11 | rb_i-10 | rb_i-9 | rb_i-8 |
| rb_(i+1)-3 | rb_(i+1)-2 | rb_(i+1)-1 | rb_(i+1)-0 | rb_i-11 | rb_i-10 | rb_i-9 | rb_i-8 |
| rb_(i+1)-3 | rb_(i+1)-2 | rb_(i+1)-1 | rb_(i+1)-0 | rb_i-11 | rb_i-10 | rb_i-9 | rb_i-8 |
| rb_(i+1)-3 | rb_(i+1)-2 | rb_(i+1)-1 | rb_(i+1)-0 | rb_i-11 | rb_i-10 | rb_i-9 | rb_i-8 |
| rb_(i+1)-3 | rb_(i+1)-2 | rb_(i+1)-1 | rb_(i+1)-0 | rb_i-11 | rb_i-10 | rb_i-9 | rb_i-8 |

L1

| | | | | | | | |
|---|---|---|---|---|---|---|---|
| rb_(i+1)-11 | rb_(i+1)-10 | rb_(i+1)-9 | rb_(i+1)-8 | rb_(i+1)-7 | rb_(i+1)-6 | rb_(i+1)-5 | rb_(i+1)-4 |
| rb_(i+1)-11 | rb_(i+1)-10 | rb_(i+1)-9 | rb_(i+1)-8 | rb_(i+1)-7 | rb_(i+1)-6 | rb_(i+1)-5 | rb_(i+1)-4 |
| rb_(i+1)-11 | rb_(i+1)-10 | rb_(i+1)-9 | rb_(i+1)-8 | rb_(i+1)-7 | rb_(i+1)-6 | rb_(i+1)-5 | rb_(i+1)-4 |
| rb_(i+1)-11 | rb_(i+1)-10 | rb_(i+1)-9 | rb_(i+1)-8 | rb_(i+1)-7 | rb_(i+1)-6 | rb_(i+1)-5 | rb_(i+1)-4 |
| rb_(i+1)-11 | rb_(i+1)-10 | rb_(i+1)-9 | rb_(i+1)-8 | rb_(i+1)-7 | rb_(i+1)-6 | rb_(i+1)-5 | rb_(i+1)-4 |
| rb_(i+1)-11 | rb_(i+1)-10 | rb_(i+1)-9 | rb_(i+1)-8 | rb_(i+1)-7 | rb_(i+1)-6 | rb_(i+1)-5 | rb_(i+1)-4 |
| rb_(i+1)-11 | rb_(i+1)-10 | rb_(i+1)-9 | rb_(i+1)-8 | rb_(i+1)-7 | rb_(i+1)-6 | rb_(i+1)-5 | rb_(i+1)-4 |
| rb_(i+1)-11 | rb_(i+1)-10 | rb_(i+1)-9 | rb_(i+1)-8 | rb_(i+1)-7 | rb_(i+1)-6 | rb_(i+1)-5 | rb_(i+1)-4 |

L0

| | | | | | | | |
|---|---|---|---|---|---|---|---|
| rb_(i+1)-11 | rb_(i+1)-10 | rb_(i+1)-9 | rb_(i+1)-8 | rb_(i+1)-7 | rb_(i+1)-6 | rb_(i+1)-5 | rb_(i+1)-4 |
| rb_(i+1)-11 | rb_(i+1)-10 | rb_(i+1)-9 | rb_(i+1)-8 | rb_(i+1)-7 | rb_(i+1)-6 | rb_(i+1)-5 | rb_(i+1)-4 |
| rb_(i+1)-11 | rb_(i+1)-10 | rb_(i+1)-9 | rb_(i+1)-8 | rb_(i+1)-7 | rb_(i+1)-6 | rb_(i+1)-5 | rb_(i+1)-4 |
| rb_(i+1)-11 | rb_(i+1)-10 | rb_(i+1)-9 | rb_(i+1)-8 | rb_(i+1)-7 | rb_(i+1)-6 | rb_(i+1)-5 | rb_(i+1)-4 |
| rb_(i+1)-11 | rb_(i+1)-10 | rb_(i+1)-9 | rb_(i+1)-8 | rb_(i+1)-7 | rb_(i+1)-6 | rb_(i+1)-5 | rb_(i+1)-4 |
| rb_(i+1)-11 | rb_(i+1)-10 | rb_(i+1)-9 | rb_(i+1)-8 | rb_(i+1)-7 | rb_(i+1)-6 | rb_(i+1)-5 | rb_(i+1)-4 |
| rb_(i+1)-11 | rb_(i+1)-10 | rb_(i+1)-9 | rb_(i+1)-8 | rb_(i+1)-7 | rb_(i+1)-6 | rb_(i+1)-5 | rb_(i+1)-4 |

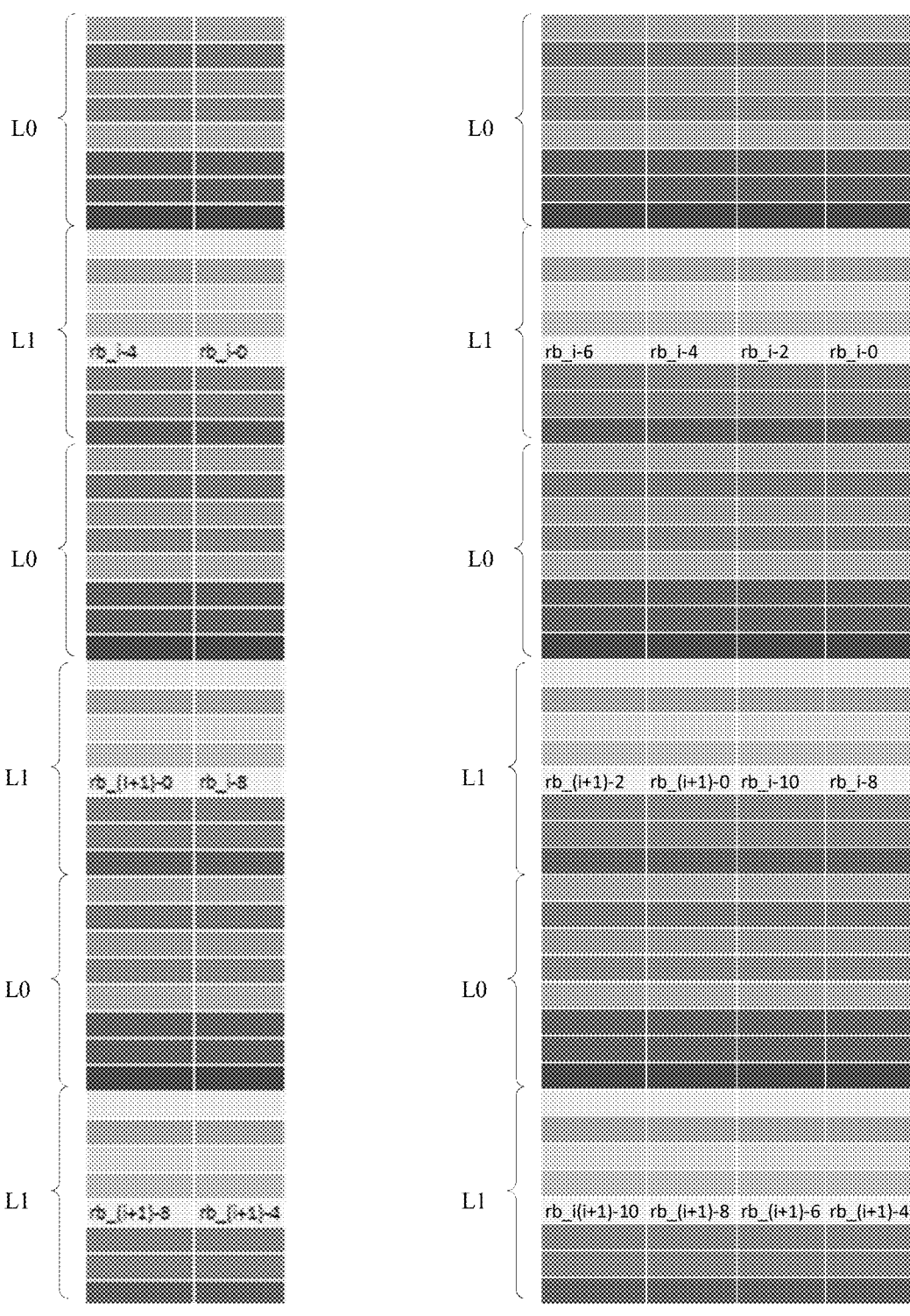
Figure 3B                                    Figure 3C

Stored Data
422

Stored Data 522

| | | | | | | | |
|---|---|---|---|---|---|---|---|
| rb_i-0 | rb_i-1 | rb_i-2 | rb_i-3 | rb_i-4 | rb_i-5 | rb_i-6 | rb_i-7 |
| rb_i+0 | rb_i+1 | rb_i+2 | rb_i+3 | rb_i+4 | rb_i+5 | rb_i+6 | rb_i+7 |
| rb_i-0 | rb_i-1 | rb_i-2 | rb_i-3 | rb_i-4 | rb_i-5 | rb_i-6 | rb_i-7 |
| rb_i+0 | rb_i+1 | rb_i+2 | rb_i+3 | rb_i+4 | rb_i+5 | rb_i+6 | rb_i+7 |
| rb_i-8 | rb_i-9 | rb_i-10 | rb_i-11 | rb_(i+1)-0 | rb_(i+1)-1 | rb_(i+1)-2 | rb_(i+1)-3 |
| rb_i+8 | rb_i+9 | rb_i+10 | rb_i+11 | rb_(i+1)+0 | rb_(i+1)+1 | rb_(i+1)+2 | rb_(i+1)+3 |
| rb_i-8 | rb_i-9 | rb_i-10 | rb_i-11 | rb_(i+1)-0 | rb_(i+1)-1 | rb_(i+1)-2 | rb_(i+1)-3 |
| rb_i+8 | rb_i+9 | rb_i+10 | rb_i+11 | rb_(i+1)+0 | rb_(i+1)+1 | rb_(i+1)+2 | rb_(i+1)+3 |
| rb_(i+1)-4 | rb_(i+1)-5 | rb_(i+1)-6 | rb_(i+1)-7 | rb_(i+1)-8 | rb_(i+1)-9 | rb_(i+1)-10 | rb_(i+1)-11 |
| rb_(i+1)+4 | rb_(i+1)+5 | rb_(i+1)+6 | rb_(i+1)+7 | rb_(i+1)+8 | rb_(i+1)+9 | rb_(i+1)+10 | rb_(i+1)+11 |
| rb_(i+1)-4 | rb_(i+1)-5 | rb_(i+1)-6 | rb_(i+1)-7 | rb_(i+1)-8 | rb_(i+1)-9 | rb_(i+1)-10 | rb_(i+1)-11 |
| rb_(i+1)+4 | rb_(i+1)+5 | rb_(i+1)+6 | rb_(i+1)+7 | rb_(i+1)+8 | rb_(i+1)+9 | rb_(i+1)+10 | rb_(i+1)+11 |

Figure 5B

| | |
|---|---|
| rb_i-4 | rb_i-0 |
| rb_i-4 | rb_i-0 |
| rb_i-4 | rb_i-0 |
| rb_i-4 | rb_i-0 |
| rb_(i+1)-0 | rb_i-8 |
| rb_(i+1)-0 | rb_i-8 |
| rb_(i+1)-0 | rb_i-8 |
| rb_(i+1)-0 | rb_i-8 |
| rb_(i+1)-8 | rb_(i+1)-4 |
| rb_(i+1)-8 | rb_(i+1)-4 |
| rb_(i+1)-8 | rb_(i+1)-4 |
| rb_(i+1)-8 | rb_(i+1)-4 |

Figure 6A

| | | | |
|---|---|---|---|
| rb_i-6 | rb_i-4 | rb_i-2 | rb_i-0 |
| rb_i-6 | rb_i-4 | rb_i-2 | rb_i-0 |
| rb_i-6 | rb_i-4 | rb_i-2 | rb_i-0 |
| rb_i-6 | rb_i-4 | rb_i-2 | rb_i-0 |
| rb_(i+1)-2 | rb_(i+1)-0 | rb_i-10 | rb_i-8 |
| rb_(i+1)-2 | rb_(i+1)-0 | rb_i-10 | rb_i-8 |
| rb_(i+1)-2 | rb_(i+1)-0 | rb_i-10 | rb_i-8 |
| rb_(i+1)-2 | rb_(i+1)-0 | rb_i-10 | rb_i-8 |
| rb_(i+1)-10 | rb_(i+1)-8 | rb_(i+1)-6 | rb_(i+1)-4 |
| rb_(i+1)-10 | rb_(i+1)-8 | rb_(i+1)-6 | rb_(i+1)-4 |
| rb_(i+1)-10 | rb_(i+1)-8 | rb_(i+1)-6 | rb_(i+1)-4 |
| rb_(i+1)-10 | rb_(i+1)-8 | rb_(i+1)-6 | rb_(i+1)-4 |

Figure 6B

Stored Data 722

Stored Data
822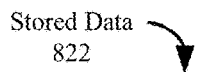

| | | | | | | | |
|---|---|---|---|---|---|---|---|
| rb_i-7 | rb_i-6 | rb_i-5 | rb_i-4 | rb_i-3 | rb_i-2 | rb_i-1 | rb_i-0 |

L0

| rb_i-7 | rb_i-6 | rb_i-5 | rb_i-4 | rb_i-3 | rb_i-2 | rb_i-1 | rb_i-0 |
|---|---|---|---|---|---|---|---|
| rb_i-7 | rb_i-6 | rb_i-5 | rb_i-4 | rb_i-3 | rb_i-2 | rb_i-1 | rb_i-0 |
| rb_i-7 | rb_i-6 | rb_i-5 | rb_i-4 | rb_i-3 | rb_i-2 | rb_i-1 | rb_i-0 |
| rb_i-7 | rb_i-6 | rb_i-5 | rb_i-4 | rb_i-3 | rb_i-2 | rb_i-1 | rb_i-0 |

L1

| rb_i-7 | rb_i-6 | rb_i-5 | rb_i-4 | rb_i-3 | rb_i-2 | rb_i-1 | rb_i-0 |
|---|---|---|---|---|---|---|---|
| rb_i-7 | rb_i-6 | rb_i-5 | rb_i-4 | rb_i-3 | rb_i-2 | rb_i-1 | rb_i-0 |
| rb_i-7 | rb_i-6 | rb_i-5 | rb_i-4 | rb_i-3 | rb_i-2 | rb_i-1 | rb_i-0 |
| rb_i-7 | rb_i-6 | rb_i-5 | rb_i-4 | rb_i-3 | rb_i-2 | rb_i-1 | rb_i-0 |

L2

| rb_i-7 | rb_i-6 | rb_i-5 | rb_i-4 | rb_i-3 | rb_i-2 | rb_i-1 | rb_i-0 |
|---|---|---|---|---|---|---|---|
| rb_i-7 | rb_i-6 | rb_i-5 | rb_i-4 | rb_i-3 | rb_i-2 | rb_i-1 | rb_i-0 |
| rb_i-7 | rb_i-6 | rb_i-5 | rb_i-4 | rb_i-3 | rb_i-2 | rb_i-1 | rb_i-0 |
| rb_i-7 | rb_i-6 | rb_i-5 | rb_i-4 | rb_i-3 | rb_i-2 | rb_i-1 | rb_i-0 |

L3

| rb_i-7 | rb_i-6 | rb_i-5 | rb_i-4 | rb_i-3 | rb_i-2 | rb_i-1 | rb_i-0 |
|---|---|---|---|---|---|---|---|
| rb_i-7 | rb_i-6 | rb_i-5 | rb_i-4 | rb_i-3 | rb_i-2 | rb_i-1 | rb_i-0 |
| rb_i-7 | rb_i-6 | rb_i-5 | rb_i-4 | rb_i-3 | rb_i-2 | rb_i-1 | rb_i-0 |
| rb_i-7 | rb_i-6 | rb_i-5 | rb_i-4 | rb_i-3 | rb_i-2 | rb_i-1 | rb_i-0 |

L0

| rb_(i+1)-3 | rb_(i+1)-2 | rb_(i+1)-1 | rb_(i+1)-0 | rb_i-11 | rb_i-10 | rb_i-9 | rb_i-8 |
|---|---|---|---|---|---|---|---|
| rb_(i+1)-3 | rb_(i+1)-2 | rb_(i+1)-1 | rb_(i+1)-0 | rb_i-11 | rb_i-10 | rb_i-9 | rb_i-8 |
| rb_(i+1)-3 | rb_(i+1)-2 | rb_(i+1)-1 | rb_(i+1)-0 | rb_i-11 | rb_i-10 | rb_i-9 | rb_i-8 |
| rb_(i+1)-3 | rb_(i+1)-2 | rb_(i+1)-1 | rb_(i+1)-0 | rb_i-11 | rb_i-10 | rb_i-9 | rb_i-8 |

L1

| rb_(i+1)-3 | rb_(i+1)-2 | rb_(i+1)-1 | rb_(i+1)-0 | rb_i-11 | rb_i-10 | rb_i-9 | rb_i-8 |
|---|---|---|---|---|---|---|---|
| rb_(i+1)-3 | rb_(i+1)-2 | rb_(i+1)-1 | rb_(i+1)-0 | rb_i-11 | rb_i-10 | rb_i-9 | rb_i-8 |
| rb_(i+1)-3 | rb_(i+1)-2 | rb_(i+1)-1 | rb_(i+1)-0 | rb_i-11 | rb_i-10 | rb_i-9 | rb_i-8 |
| rb_(i+1)-3 | rb_(i+1)-2 | rb_(i+1)-1 | rb_(i+1)-0 | rb_i-11 | rb_i-10 | rb_i-9 | rb_i-8 |

L2

| rb_(i+1)-3 | rb_(i+1)-2 | rb_(i+1)-1 | rb_(i+1)-0 | rb_i-11 | rb_i-10 | rb_i-9 | rb_i-8 |
|---|---|---|---|---|---|---|---|
| rb_(i+1)-3 | rb_(i+1)-2 | rb_(i+1)-1 | rb_(i+1)-0 | rb_i-11 | rb_i-10 | rb_i-9 | rb_i-8 |
| rb_(i+1)-3 | rb_(i+1)-2 | rb_(i+1)-1 | rb_(i+1)-0 | rb_i-11 | rb_i-10 | rb_i-9 | rb_i-8 |
| rb_(i+1)-3 | rb_(i+1)-2 | rb_(i+1)-1 | rb_(i+1)-0 | rb_i-11 | rb_i-10 | rb_i-9 | rb_i-8 |

L3

| rb_(i+1)-3 | rb_(i+1)-2 | rb_(i+1)-1 | rb_(i+1)-0 | rb_i-11 | rb_i-10 | rb_i-9 | rb_i-8 |
|---|---|---|---|---|---|---|---|
| rb_(i+1)-3 | rb_(i+1)-2 | rb_(i+1)-1 | rb_(i+1)-0 | rb_i-11 | rb_i-10 | rb_i-9 | rb_i-8 |
| rb_(i+1)-3 | rb_(i+1)-2 | rb_(i+1)-1 | rb_(i+1)-0 | rb_i-11 | rb_i-10 | rb_i-9 | rb_i-8 |
| rb_(i+1)-3 | rb_(i+1)-2 | rb_(i+1)-1 | rb_(i+1)-0 | rb_i-11 | rb_i-10 | rb_i-9 | rb_i-8 |

L0

| rb_(i+1)-11 | rb_(i+1)-10 | rb_(i+1)-9 | rb_(i+1)-8 | rb_(i+1)-7 | rb_(i+1)-6 | rb_(i+1)-5 | rb_(i+1)-4 |
|---|---|---|---|---|---|---|---|
| rb_(i+1)-11 | rb_(i+1)-10 | rb_(i+1)-9 | rb_(i+1)-8 | rb_(i+1)-7 | rb_(i+1)-6 | rb_(i+1)-5 | rb_(i+1)-4 |
| rb_(i+1)-11 | rb_(i+1)-10 | rb_(i+1)-9 | rb_(i+1)-8 | rb_(i+1)-7 | rb_(i+1)-6 | rb_(i+1)-5 | rb_(i+1)-4 |
| rb_(i+1)-11 | rb_(i+1)-10 | rb_(i+1)-9 | rb_(i+1)-8 | rb_(i+1)-7 | rb_(i+1)-6 | rb_(i+1)-5 | rb_(i+1)-4 |

L1

| rb_(i+1)-11 | rb_(i+1)-10 | rb_(i+1)-9 | rb_(i+1)-8 | rb_(i+1)-7 | rb_(i+1)-6 | rb_(i+1)-5 | rb_(i+1)-4 |
|---|---|---|---|---|---|---|---|
| rb_(i+1)-11 | rb_(i+1)-10 | rb_(i+1)-9 | rb_(i+1)-8 | rb_(i+1)-7 | rb_(i+1)-6 | rb_(i+1)-5 | rb_(i+1)-4 |
| rb_(i+1)-11 | rb_(i+1)-10 | rb_(i+1)-9 | rb_(i+1)-8 | rb_(i+1)-7 | rb_(i+1)-6 | rb_(i+1)-5 | rb_(i+1)-4 |
| rb_(i+1)-11 | rb_(i+1)-10 | rb_(i+1)-9 | rb_(i+1)-8 | rb_(i+1)-7 | rb_(i+1)-6 | rb_(i+1)-5 | rb_(i+1)-4 |

L2

| rb_(i+1)-11 | rb_(i+1)-10 | rb_(i+1)-9 | rb_(i+1)-8 | rb_(i+1)-7 | rb_(i+1)-6 | rb_(i+1)-5 | rb_(i+1)-4 |
|---|---|---|---|---|---|---|---|
| rb_(i+1)-11 | rb_(i+1)-10 | rb_(i+1)-9 | rb_(i+1)-8 | rb_(i+1)-7 | rb_(i+1)-6 | rb_(i+1)-5 | rb_(i+1)-4 |
| rb_(i+1)-11 | rb_(i+1)-10 | rb_(i+1)-9 | rb_(i+1)-8 | rb_(i+1)-7 | rb_(i+1)-6 | rb_(i+1)-5 | rb_(i+1)-4 |
| rb_(i+1)-11 | rb_(i+1)-10 | rb_(i+1)-9 | rb_(i+1)-8 | rb_(i+1)-7 | rb_(i+1)-6 | rb_(i+1)-5 | rb_(i+1)-4 |

L3

| rb_(i+1)-11 | rb_(i+1)-10 | rb_(i+1)-9 | rb_(i+1)-8 | rb_(i+1)-7 | rb_(i+1)-6 | rb_(i+1)-5 | rb_(i+1)-4 |
|---|---|---|---|---|---|---|---|
| rb_(i+1)-11 | rb_(i+1)-10 | rb_(i+1)-9 | rb_(i+1)-8 | rb_(i+1)-7 | rb_(i+1)-6 | rb_(i+1)-5 | rb_(i+1)-4 |
| rb_(i+1)-11 | rb_(i+1)-10 | rb_(i+1)-9 | rb_(i+1)-8 | rb_(i+1)-7 | rb_(i+1)-6 | rb_(i+1)-5 | rb_(i+1)-4 |
| rb_(i+1)-11 | rb_(i+1)-10 | rb_(i+1)-9 | rb_(i+1)-8 | rb_(i+1)-7 | rb_(i+1)-6 | rb_(i+1)-5 | rb_(i+1)-4 |

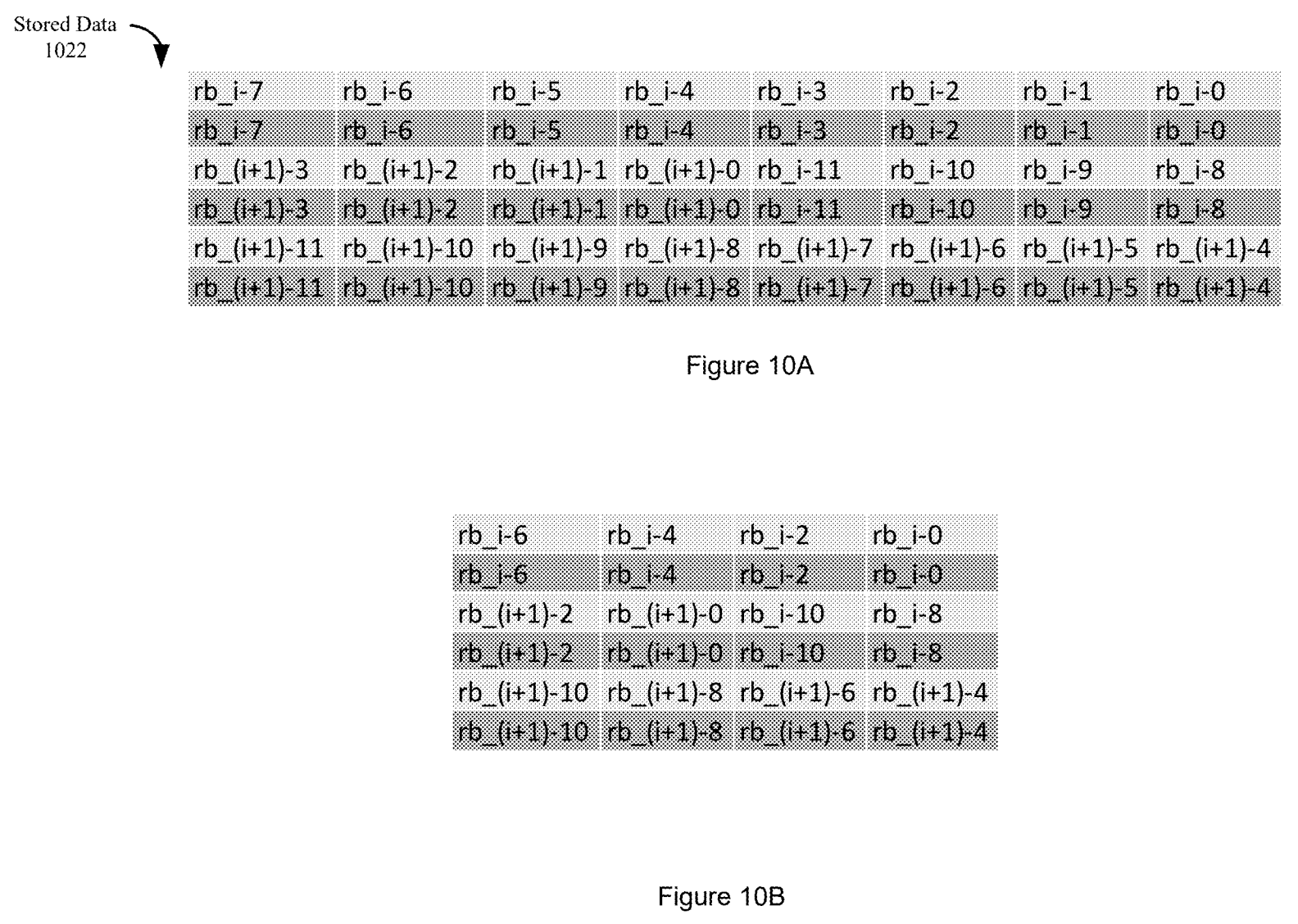

| rb_i-7 | rb_i-6 | rb_i-5 | rb_i-4 | rb_i-3 | rb_i-2 | rb_i-1 | rb_i-0 |
|---|---|---|---|---|---|---|---|
| rb_i-7 | rb_i-6 | rb_i-5 | rb_i-4 | rb_i-3 | rb_i-2 | rb_i-1 | rb_i-0 |
| rb_(i+1)-3 | rb_(i+1)-2 | rb_(i+1)-1 | rb_(i+1)-0 | rb_i-11 | rb_i-10 | rb_i-9 | rb_i-8 |
| rb_(i+1)-3 | rb_(i+1)-2 | rb_(i+1)-1 | rb_(i+1)-0 | rb_i-11 | rb_i-10 | rb_i-9 | rb_i-8 |
| rb_(i+1)-11 | rb_(i+1)-10 | rb_(i+1)-9 | rb_(i+1)-8 | rb_(i+1)-7 | rb_(i+1)-6 | rb_(i+1)-5 | rb_(i+1)-4 |
| rb_(i+1)-11 | rb_(i+1)-10 | rb_(i+1)-9 | rb_(i+1)-8 | rb_(i+1)-7 | rb_(i+1)-6 | rb_(i+1)-5 | rb_(i+1)-4 |

Stored Data 1022

Figure 10A

| rb_i-6 | rb_i-4 | rb_i-2 | rb_i-0 |
|---|---|---|---|
| rb_i-6 | rb_i-4 | rb_i-2 | rb_i-0 |
| rb_(i+1)-2 | rb_(i+1)-0 | rb_i-10 | rb_i-8 |
| rb_(i+1)-2 | rb_(i+1)-0 | rb_i-10 | rb_i-8 |
| rb_(i+1)-10 | rb_(i+1)-8 | rb_(i+1)-6 | rb_(i+1)-4 |
| rb_(i+1)-10 | rb_(i+1)-8 | rb_(i+1)-6 | rb_(i+1)-4 |

Stored Data 1122

DATA STRUCTURE CONVERSION TO REDUCE AN AMOUNT OF PROCESSING BY A PROCESSOR IN A COMMUNICATION SYSTEM

CROSS-REFERENCE TO RELATED APPLICATIONS

This application claims the benefit and priority to the U.S. Provisional Patent Application No. 63/603,634 filed on Nov. 28, 2023, which is incorporated herein by reference in its entirety.

BACKGROUND

Resources are generally allocated to a cell, e.g., in a 5G network, by a base station when a particular cell is being set up. For example, frame or subframe or physical resource block (PRB) are generally assigned by a base station to a given cell and users for data transmission (receive/sent) based on the carrier configuration, e.g., channel bandwidth, number of antennas, number of layers, number of users, etc. Communication may be initiated after the cell is set up by the base station.

Communicated data, e.g., received data, may include a number of data streams (also referred to as layers) by a number of subcarriers (in a particular frequency band also referred to as resource block (RB)) that are received by multiple antennas. The received data is generally in a form (structure) that is not suitable for processing for its content, thereby requiring additional upfront processing by a processor (e.g., digital signal processor (DSP)) to prepare and transform the received data (e.g., transform the data) to a form that is native for the processor to process. The initial processing of the received data wastes valuable resources of the processor by taking away valuable processing resources and by allocating those resources to prepare and restructure the received data before they can be processed. Moreover, there are often times data associated with the received data that may not be needed result in waste of valuable resources, e.g., processing, because they are not purged.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 2A-2B depict examples of two different sparsity of the received data from FIG. 1 according to one aspect of the present embodiments.

FIGS. 3A-3C depict examples of a data stored in a two-layer data streams and two different sparsity according to one aspect of the present embodiments.

FIGS. 5A-5B depict examples of received data in a four-antenna system with one-layer stream and the storing of the received data according to one aspect of the presentation embodiments.

FIGS. 6A-6B depict examples of two different sparsity of the stored data from FIG. 5B according to one aspect of the present embodiments.

FIGS. 7A-7C depict examples of stored data for a four-antenna system with two-layer streams and two different sparsity of the stored data according to one aspect of the present embodiments.

FIGS. 8A-8B depict examples of stored data for a four-antenna system with four-layer streams and one sparsity of the stored data according to one aspect of the present embodiments.

FIG. 9 depicts an example of received data in a two-antenna system with one-layer stream according to one aspect of the presentation embodiments.

FIGS. 10A-10B depict examples of stored data for the received data in FIG. 9 and a sparsity of the stored data according to one aspect of the present embodiments.

FIGS. 11A-11B depict an example of stored data in a two-antenna system with two layers of streams and a sparsity of the stored data according to one aspect of the present embodiments.

FIGS. 12A-12C depict examples of data restructured in an eight-antenna system with various layers of streams and sparsity according to one aspect of the present embodiments.

FIGS. 13A-13H depict examples of data restructured in a four-antenna system with various layers of streams and sparsity according to one aspect of the present embodiments.

FIGS. 14A-14B depict examples of data restructured in a two-antenna system with various layers of stream and sparsity according to one aspect of the present embodiments.

FIGS. 15A-15B depict examples of data restructured in a sixteen-antenna system with various layers of stream and sparsity according to one aspect of the present embodiments.

DETAILED DESCRIPTION

Figure 1A:
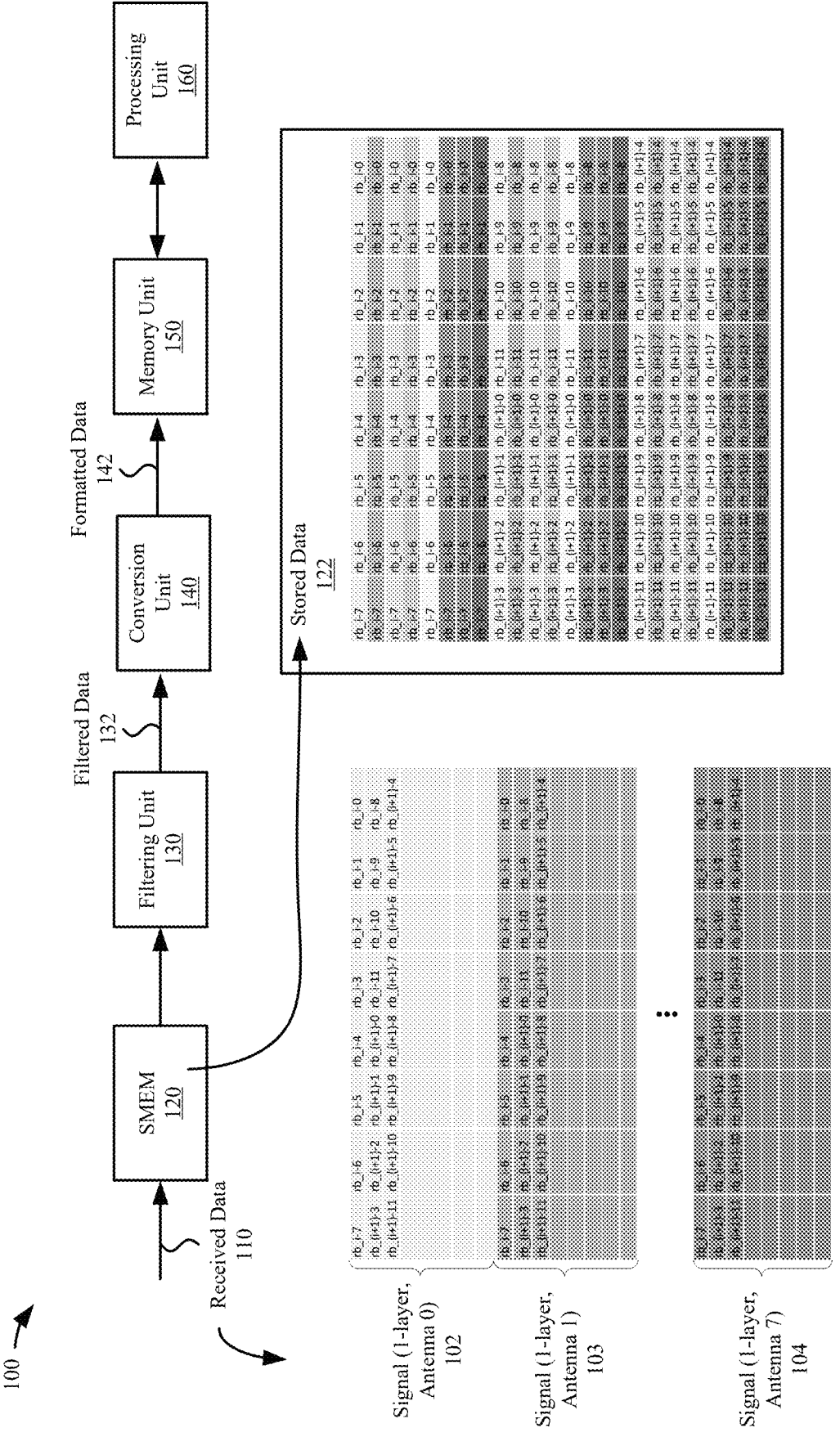
FIG. 1A depicts an example of a system for restructuring the received data according to one aspect of the present embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

In wireless communication, e.g., 5G, a number of data streams (e.g., layers) may be communicated. The number of layers may vary and may be as an example 1, 2, 4, 8, etc. RBs are associated with users in the communication network. Each RB may contain 12 consecutive blocks of cell data in frequency domain. According to one nonlimiting example, each RB includes 32-bit resource elements (REs), e.g., tones/samples. Any number of antennas may be used for data communication, e.g., 1, 2, 4, 8, 16, etc. The received data is traditionally stored by antenna layer (described in greater detail below), which is not native to the processor, e.g., a DSP. Accordingly, a need has arisen to restructure the data to a format that is native to the processor in order to alleviate the need by the processor having to perform the data restructuring, thereby saving valuable processing resources.

Moreover, adjacent channel response data samples may be highly correlated and as a result processing them results in waste of processing resources as well as additional overhead resulting from data movement. As such, a need has arisen to remove certain data (e.g., adjacent channel response data samples that are highly correlated) prior to the data being processed by the processor in order to save valuable processing resources from having to operate on data that may be obtained from an adjacent channel, thereby reducing processing waste. Accordingly, sparsity may be used to remove a certain number of resource elements, e.g., one out of every four, one out of every two, etc., as described in greater detail with respect to the drawings below.

In one nonlimiting example, unnecessary data, e.g., data other than estimated channel data, is also removed from the received data. Unnecessary data may include data associated with use equipment, data associated with generated reference signal, data associated with received reference signal, etc. Removing unnecessary data reduces the processing burden on the processor as well as reducing overhead and latencies associated with moving data that is unnecessary. According to one nonlimiting example, the received data saved in antenna layer format is transposed to form an interleaved antenna layers (described in greater detail below) that is more native for processing by the processor. In other words, the data is restructured into a format required by a downstream processor, e.g., frequency domain equalizer (FDEQ).

FIG. 1A depicts an example of a system 100 for restructuring the received data according to one aspect of the present embodiments. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

Each of the units in the system 100 is a dedicated hardware block/component including one or more processors (e.g., microprocessors) and on-chip memory units storing software instructions. When the software instructions are executed by the processors, each of the hardware components becomes a special purposed hardware component for managing power and for executing job commands, as discussed in detail below. In some embodiments, the system 100 is on a single chip, e.g., a system-on-chip (SOC).

System 100 may be a base station with eight antennas and a single layer (data stream). The system 100 includes a share memory (SMEM) unit 120, a filtering unit 130, a conversion unit 140, a memory unit 150, and a processing unit 160.

It is appreciated that the number of antennas, the number of layers, etc., used throughout this application is for illustrative purposes only and should not be construed as limiting the scope of the embodiments. For example, as shown in subsequent drawings below a different number of antennas, layers, etc., are used for illustration purposes.

The received data 110 is a single layer data as received by each antenna (total of eight antennas in this example). In one nonlimiting example, the received data 110 may be 256 bit aligned and a multiple of 256 bits in length per job (e.g., direct memory access (DMA)). The received data 110 may include signal 102 that is a 1-layer signal for antenna 0, whereas signal 103 is a 1-layer signal for antenna 1, and signal 104 is a 1-layer signal for antenna 7. It is appreciated that the signals for antennas 2-6 are not shown but are present. It is appreciated that the received data 110 is stored in an antenna layer format in a memory, e.g., SMEM 120. For example, the first row rb_i–7, rb_i–6, . . . , rb_i–0 for signal 102 are different RBs as received by antenna 0 at time 0, followed by the second row rb_(i+1)–3, rb_(i+1)–2, . . . , rb_i–8 for signal 102 at time 1, third row rb_(i+1)–11, rb_(i+1)–10, . . . , rb_i–4 at time 2, etc. It is appreciated that the same RBs are received by each antenna, e.g., antennas 1-7. For example, the first row rb_i–7, rb_i–6, . . . , rb_i–0 for signal 103 are different RBs as received by antenna 1 similar to antenna 0 at time 0. It is appreciated that the first row from signal 102 is stored in SMEM 120 followed by the first row from signal 103, and so and so forth to form the stored data 122. In other words, RBs (i.e., rb_i–7 through rb_i–0) received by antennas 0-7 at time 0 are stored in the first eight rows as stored data 122. Different RBs received by the antennas in subsequent time, e.g., time 1, time 2, etc., are stored in the subsequent eight rows, e.g., rows 9-16, 17-24, etc., in a similar fashion, as described above, to form the stored data 122. It is appreciated that the SMEM 120 is shown for illustration purposes and should not be construed as limiting the scope of the embodiments. For example, a dynamic random-access memory (DRAM) may be used.

It is appreciated that the received data 110 may, in some cases, include unnecessary data, e.g., data other than estimated channel data, which may lead to waste of valuable processing resources. As such, the unnecessary data may be removed before storing the needed data in the memory unit 150. Unnecessary data may include data associated with use equipment, data associated with generated reference signal, data associated with received reference signal, etc. Removing unnecessary data reduces the processing burden on the processor as well as reducing overhead and latencies associated with moving data that is unnecessary. The received data 110 may include blocks of data starting with use equipment block of data followed by a plurality of pairs of estimated channel data block and generated/received reference signal blocks. According to some embodiments, the use equipment information is discarded with its length defined by the use equipment information size as defined by the configuration data that is received. According to one non-limiting example, configuration data sizes are 256 bit words. The first estimated channel data block that is non-zero contains a starting RB (which in this example is 12*32 bit resource elements=3*128 bit words) for each antenna and each layer which is not 256 bit aligned and starts after the first 3*128 bits for each antenna and each layer which are discarded. The valid RBs are buffered in SMEM 120 (forming the stored data 122). The generated/received reference signal block following the first estimated channel data block is discarded where its size is defined by the configuration data as received. Subsequent estimated channel data blocks and generated/received reference signal blocks are repeated as pairs and the number of pairs and their respective sizes are defined by the configuration data. The estimated channel data blocks (e.g., RBs) are buffered and the generated/received reference signal blocks are discarded. In one nonlimiting example, the last estimated channel data block may include 128 bits of invalid data for each antenna and each layer only if the configuration flag is asserted for odd numbers for the last estimated channel data block, which may be discarded otherwise all of the RB data is valid and are buffered in SMEM 120.

As illustrated, each row of the stored data 122 includes data from different RBs while the same RBs from different antennas are stacked in a column, e.g., rb_i–0 for antennas 0-7 are in rows 1-8 in column 8, rb_i–1 for antennas 0-7 are in rows 1-8 in column 7, rb_i–11 for antennas 0-7 are in rows 9-16 in column 5, etc. The extracted estimated channel data (RBs) is organized as rows of 256-bit transfers and are transposed and stored in SMEM 120. Each cell may contain resource element that may be 32-bits. In this nonlimiting example, eight resource elements are received in two 128-bit transfers from the same antenna and layer and each subsequent row represents a different antenna and layer combination. In this nonlimiting example, resource element numbering advances from 0 to 11 and repeats within a specific RB for each antenna/layer combination. A downstream processor, e.g., processor unit 160 such as FDEQ, should process the same RBs, e.g., rb_i–0 from antennas 0-7, rb_(i+1)–2 from antennas 0-7, etc., from different antennas. However, the data that needs to be processed by the downstream processor is stored in a columnar fashion, as shown, but is read in a row fashion, thereby requiring additional processing first to be restructured in a format that is native to the processor unit 160.

Figure 1B:
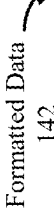
FIG. 1B depicts an example of a data after being reformatted according to one aspect of the present embodiments.

In some embodiments, the downstream processor 160 needs to operate and process data in the columnar fashion rather than row fashion because the same RBs from different antennas are arranged in columnar fashion. However, the data is read row by row as opposed to column by column. As such, restructuring and reformatting of data may be needed such that when the data is transmitted downstream for processing by a processing unit 160 no further data restructuring/reformatting would be needed by the processor unit 160. The conversion unit 140 may perform data restructuring and reformatting in order to rearrange the stored data 122 to form a formatted data 142, as shown in FIG. 1B. The conversion unit 140 transposes a subset of elements within each column and places them in a row format such that when data is being fetched in a row fashion by the processing unit 160, the same RBs from different antennas are being fetched.

For example, rb_i–0 from antennas 0-7 in stored data 122 are transposed and stored in a row fashion (as opposed to columnar fashion), as shown in FIG. 1B. Similarly, rb_i–1 from antennas 0-7 in stored data 122 are transposed and stored in a row fashion (as opposed to columnar fashion), as shown in FIG. 1B. Other RBs are similarly transposed to form formatted data 142, e.g., rb_i–1 from antennas 0-7 are transposed and stored in a row fashion (as opposed to columnar fashion), rb_(i+1)–10 from antennas 0-7 are transposed and stored in a row fashion (as opposed to columnar fashion), etc. In one nonlimiting example, eight rows (e.g., rows 1-8) from column 8 corresponding to rb_i–0 is transposed to form a new first row comprising rb_i–0 from antennas 0-7 while rows 1-8 from column 7 corresponding to rb_i–1 is transposed to form a new second row comprising rb_i–1, etc., as shown in FIG. 1B. It is appreciated that once rows 1-8 from column 1 corresponding to rb_i–7 is transposed to form a new row 8, the process continues to rows 9-16 of column 8 and the process repeats itself for columns 7-1 and the process continues to rows 17-24 and the process continues as described above. As such, the formatted data 142 forms rows are arranged chronologically (over time as they are received), as illustrated in FIG. 1B. Accordingly, the conversion unit 140 is configured to transpose the input data grouped by antenna layer into data that has interleaved antenna layers.

Figures 2A, 2B:
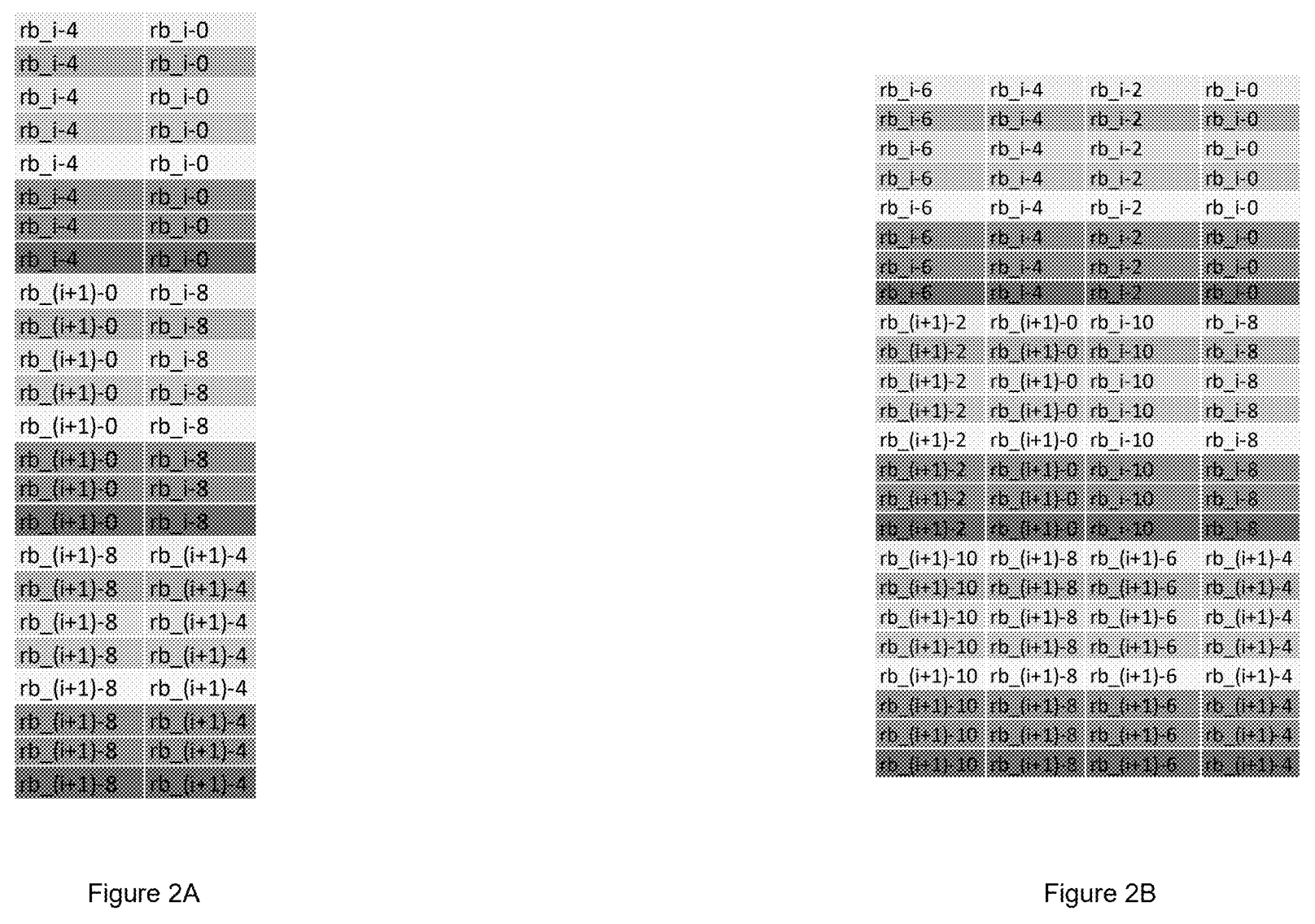

It is appreciated that in one nonlimiting example, a fraction of resource elements per RB is kept, which is known as sparsity. For example, sparsity of 0.25 indicates that 1 out of 4 resource elements is kept while sparsity of 0.5 indicates that 1 out of 2 resource elements is kept and where sparsity of 1 indicates that every resource element is kept (which essentially bypasses the filtering). The filtering unit 130 may be used to filter out resource elements as indicated by sparsity to form the filtered data 132, which is then sent to the conversion unit 140 to restructure and reformat the data, as described above. In one nonlimiting example, sparsity of 1 indicates that no resource element is filtered and as such all RBs are sent to the conversion unit 140 to be restructured and reformatted to form the formatted data 142. FIGS. 2A and 2B illustrate sparsity of 0.25 and 0.5 for the data in FIGS. 1A and 1B.

It is appreciated that the formatted data 142 may be stored in the memory unit 150, e.g., parameter memory (PMEM). For example, the formatted data 142 with sparsity of 1, as shown in FIG. 1B, may be stored in the memory unit 150. Once the formatted data 142 is stored, it may be fetched by the processing unit 160 for processing when needed. In one nonlimiting example, the formatted data 142 is sent (pushed) by the memory unit 150 to the processing unit 160.

It is appreciated that the examples throughout this application are described with respect to data (different resource blocks for each antenna) being written in a row fashion and being read in a row fashion by a processor for illustrative purposes that should not be construed as limiting the scope of the embodiments. For example, in some embodiments data may be written in a columnar fashion and read in a columnar fashion and using the word row and column are a matter of perspective. It is appreciated that writing different resource blocks for a given antenna in a given row and reading that data in a row fashion necessitates the need to format that data by transposing it to group the same resource block from different antennas in a given row so that when it is read by the processor it can be processed without a need to reformat or restructure the data. Similarly, if the data is being written in a columnar fashion and being read in columnar fashion, different resource blocks for a given antenna are being written in a given column and read in a columnar fashion which similarly necessitates the need to format that data by transposing it to group the same resource block from different antennas in a given column so that when it is read by the processor it can be processed without a need to reformat or restructure the data.

Referring now to FIG. 3A, a stored data 322 in an example of a system 100 with eight antennas and two layer is shown for illustration purposes. In this nonlimiting example, the stored data 322 includes rb_i–7 through rb_i–0 for rows 1-8 (corresponding to antennas 0-7) for layer L0 and further includes rb_i–7 through rb_i–0 for rows 9-16 (corresponding to antennas 0-7) for layer L1, at time 0. At time 1, the stored data 322 includes rb_(i+1)–3 through rb_i–8 (corresponding to antennas 0-7) for layer L0 and further includes rb_(i+1)–3 through rb_i–8 (corresponding to antennas 0-7) for layer L1. Additional RBs in subsequent time is stored in a similar fashion, forming the stored data 322. Referring now to FIGS. 3B and 3C, sparsity of 0.25 and 0.5 for the data in FIG. 3A is shown.

Figures 4A, 4B:
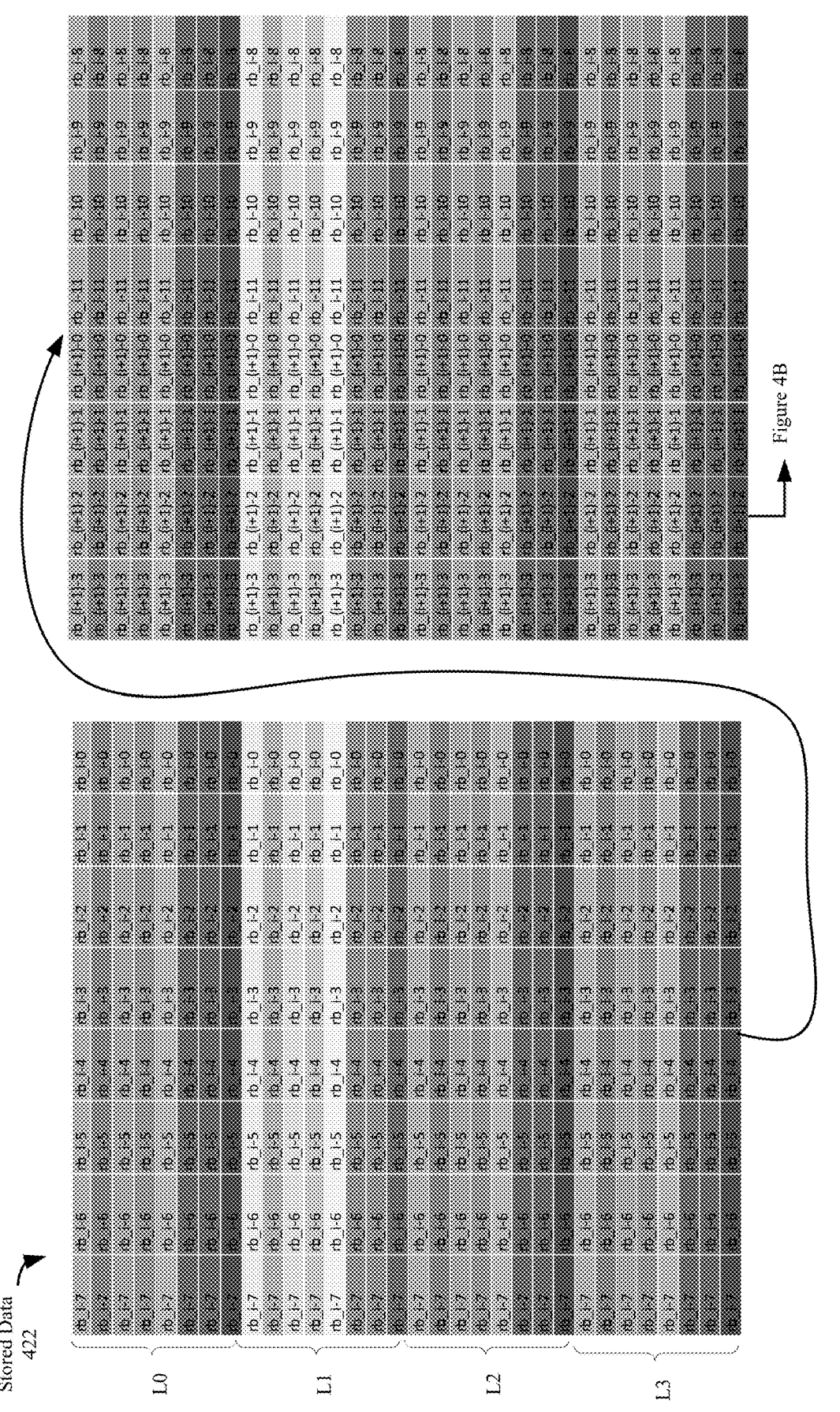
FIGS. 4A-4D depict examples of a data stored in a four-layer data streams and two different sparsity according to one aspect of the present embodiments.
Figure 4B:
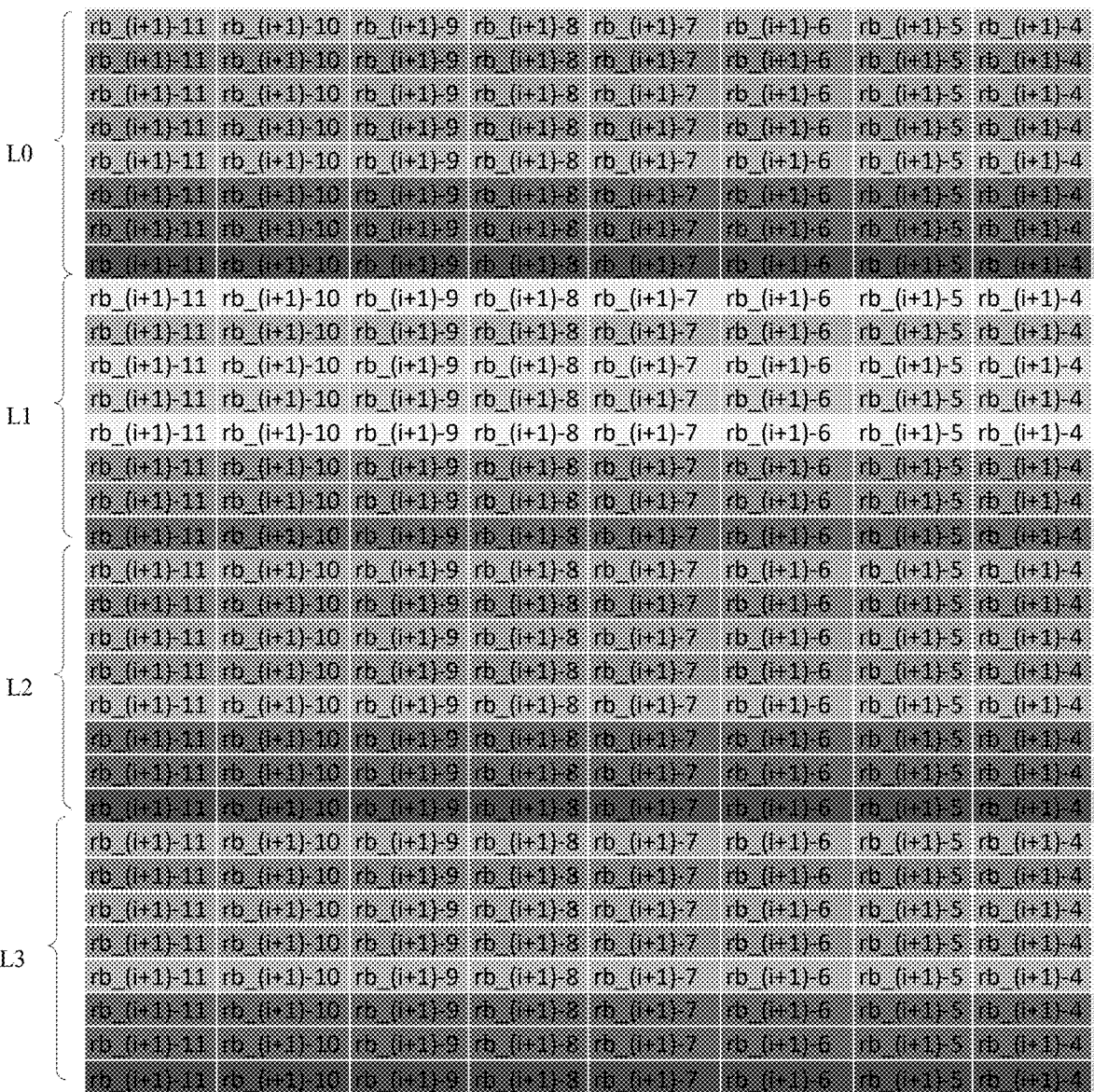
Figures 4C, 4D:
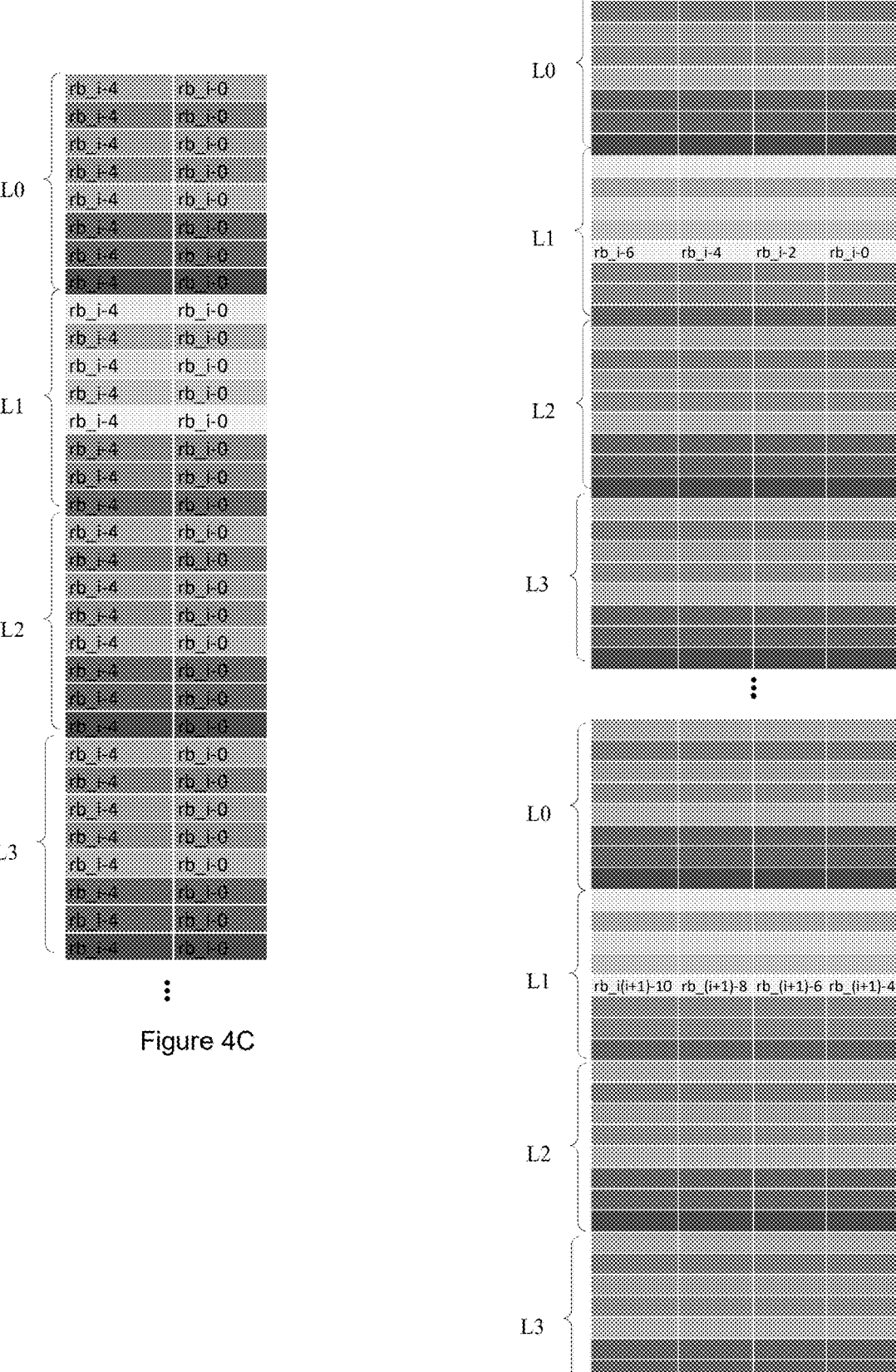

Referring now to FIGS. 4A-4B, a stored data 422 in an example of a system 100 with eight antennas and four layers is shown for illustration purposes. In this nonlimiting example, the stored data 422 includes rb_i–7 through rb_i–0 for rows 1-8 (corresponding to antennas 0-7) for layer L0 and further includes rb_i–7 through rb_i–0 for rows 9-16 (corresponding to antennas 0-7) for layer L1 and further includes rb_i–7 through rb_i–0 for rows 17-24 (corresponding to antennas 0-7) for layer L2 and further includes rb_i–7 through rb_i–0 for rows 25-32 (corresponding to antennas 0-7) for layer L3, at time 0. At time 1, the stored data 422 includes rb_(i+1)–3 through rb_i–8 (corresponding to antennas 0-7) for layers L0 through L3. Additional RBs in subsequent time is stored in a similar fashion, forming the stored data 422. Referring now to FIGS. 4C and 4D, sparsity of 0.25 and 0.5 for the data in FIGS. 4A-4B is shown.

Figure 5A:
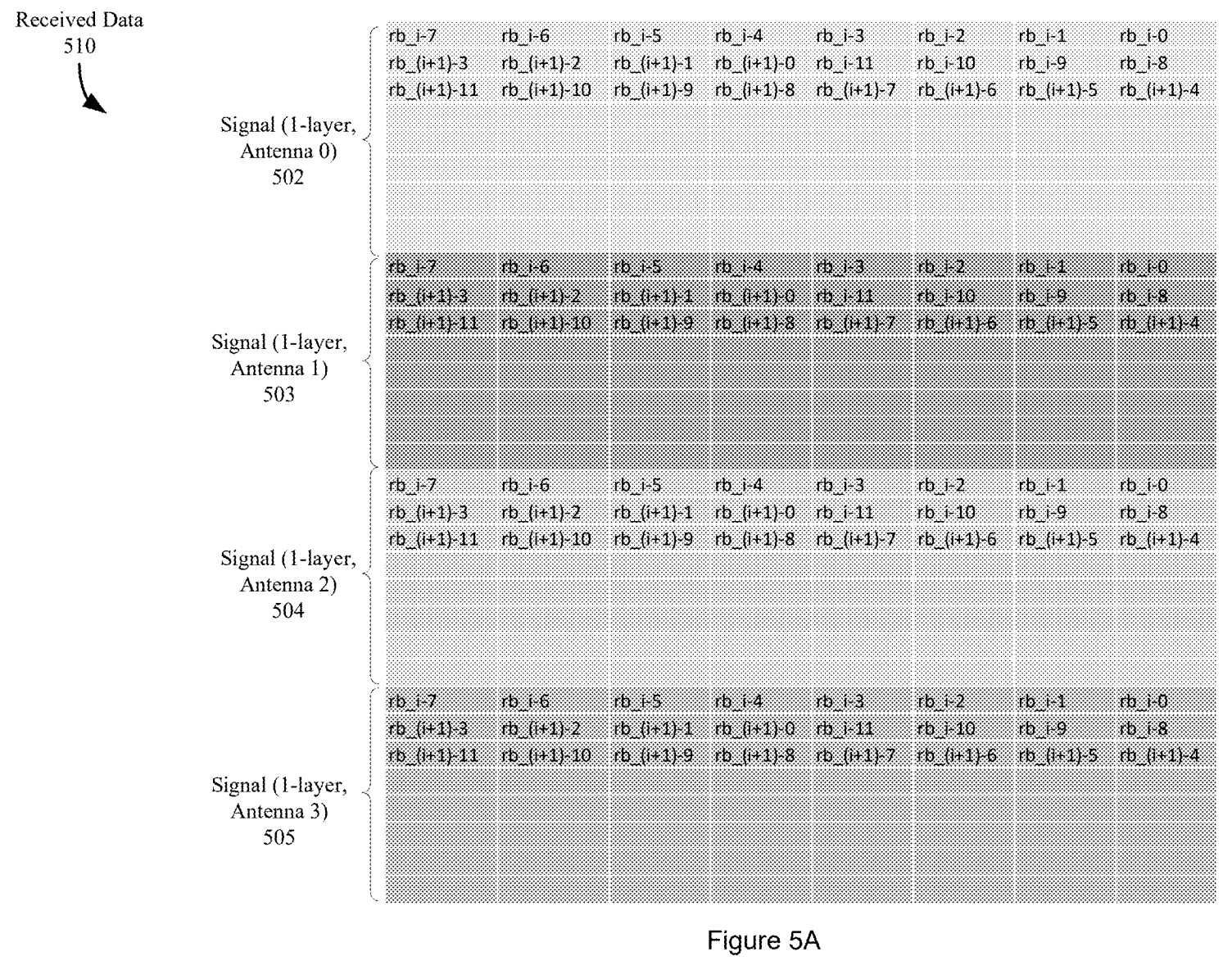

Referring now to FIG. 5A, an example of the received data 510 after unnecessary data is discarded is shown. The received data 510 in an example of a system 100 with four antennas and in a single layer. The received data 510 includes signals 502, 502, 504, and 505 corresponding to antennas 0-3 respectively. It is appreciated that the received data 510 is similar to the received data 110 except that it is in a four-antenna single-layer system. The received data 510 is stored in a memory, e.g., SMEM 120, as stored data 522 as shown in FIG. 5B, similar to the stored data 122. Referring now to FIGS. 6A and 6B, sparsity of 0.25 and 0.5 for the stored data 522 are shown respectively.

Figure 7A:
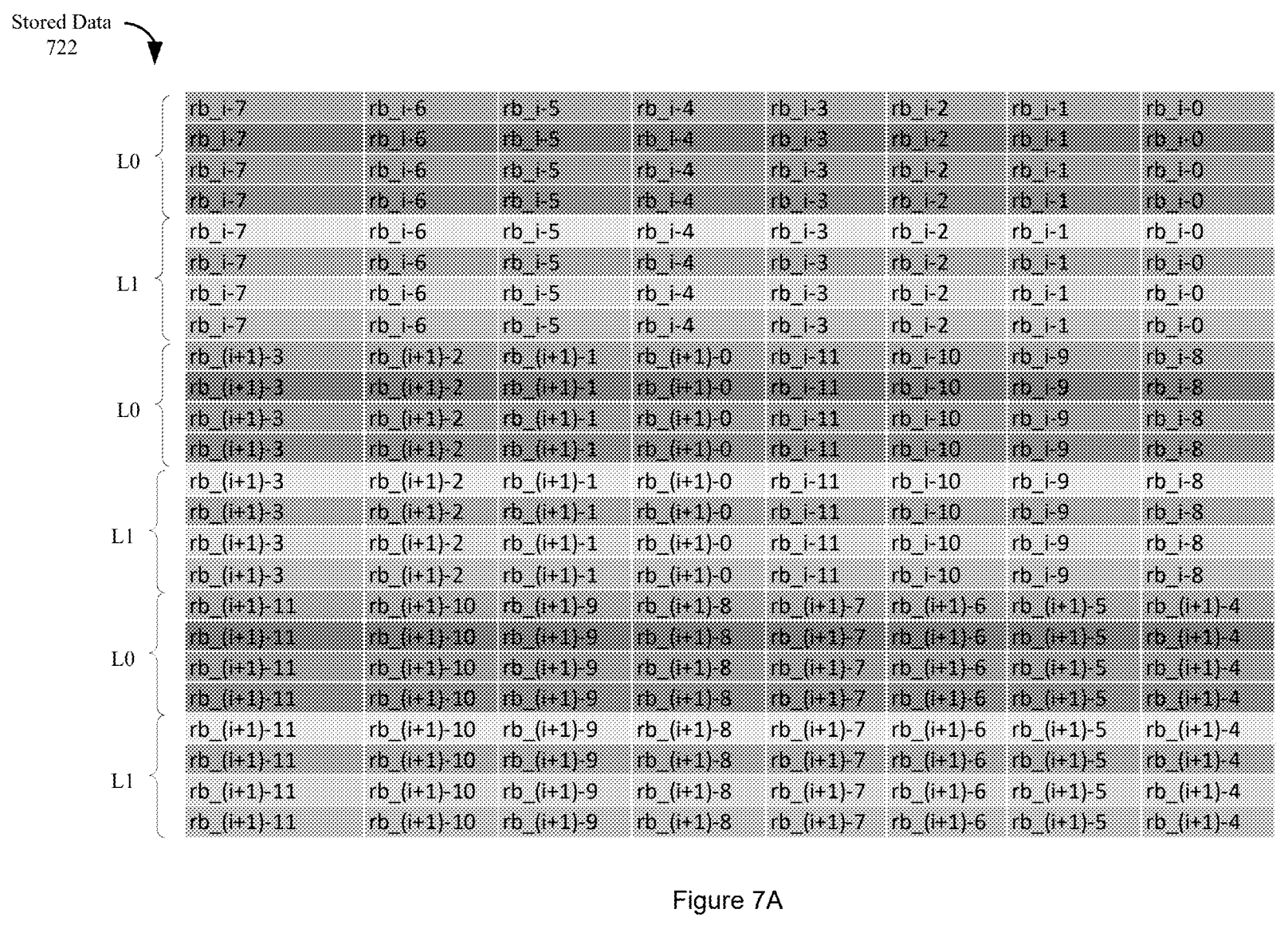
Figures 7B, 7C:
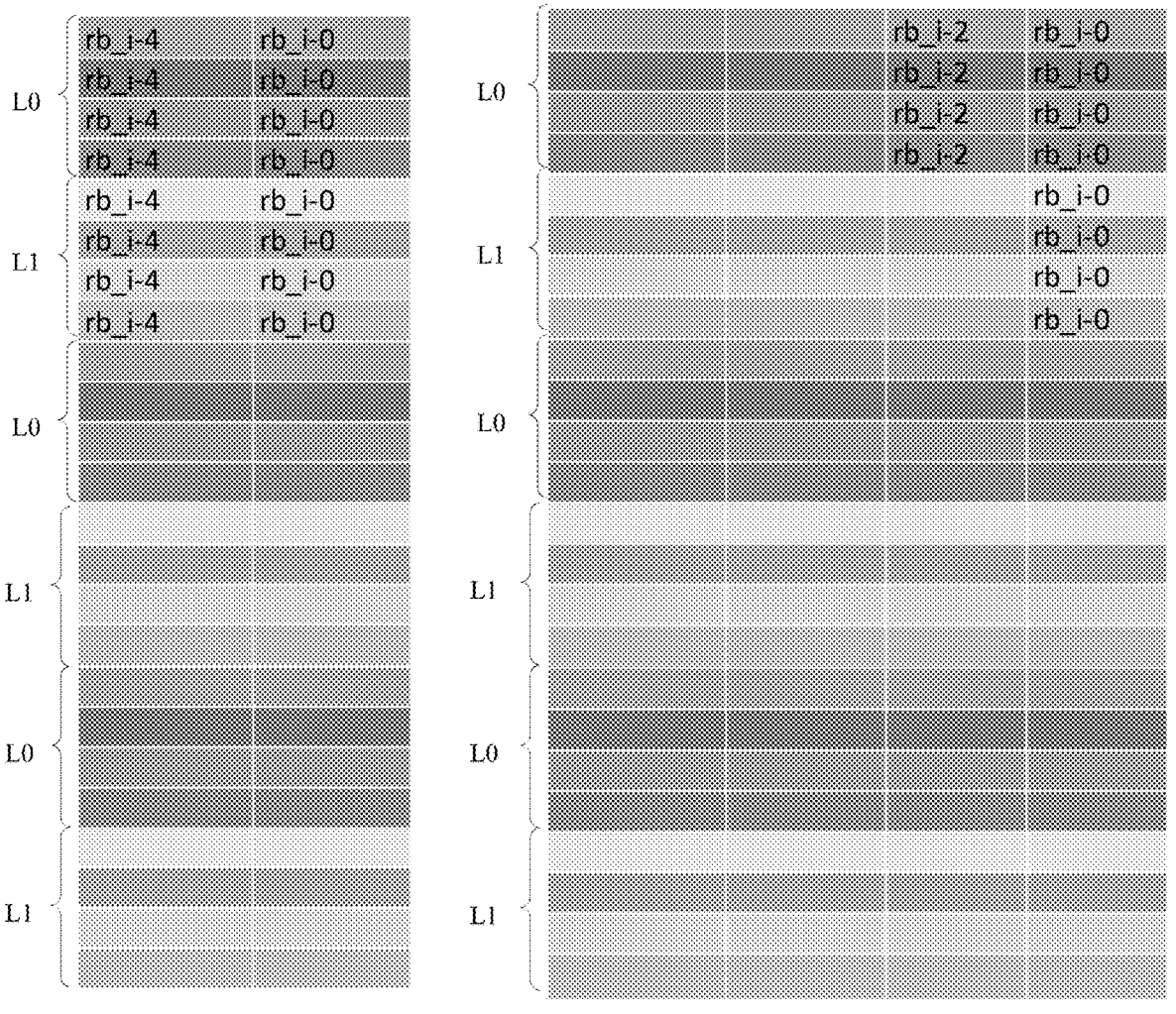

Referring now to FIG. 7A, an example of the stored data 722 of a received data in in an example of a system 100 with four antennas and two layers is shown. Referring now to FIGS. 7B and 7C, sparsity of 0.25 and 0.5 for the stored data 722 are shown respectively.

Figure 8B:
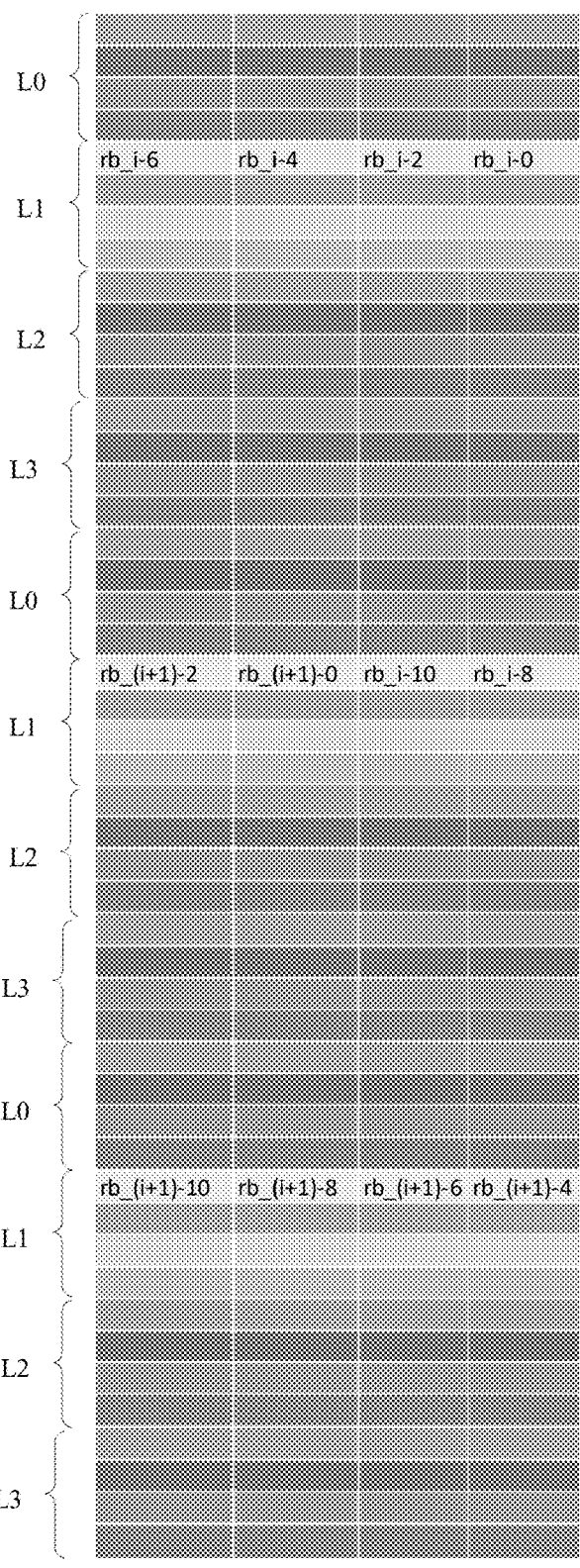

Referring now to FIG. 8A, a stored data 822 in an example of a system 100 with four antennas and four layers is shown. FIG. 8B illustrates sparsity of 0.5 for the stored data 822.

Figure 9:
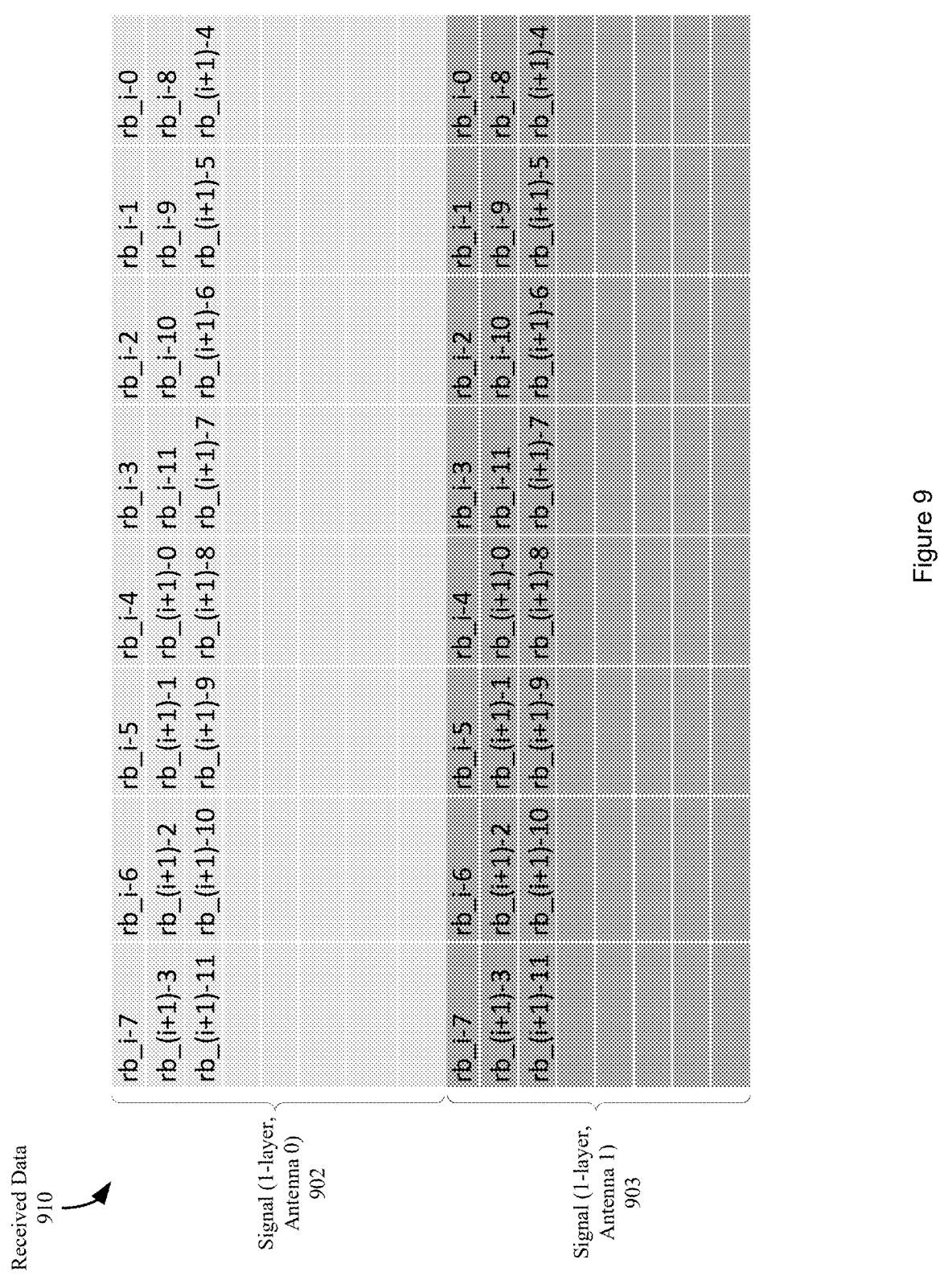

FIG. 9 depicts an example of received data 910 in a two-antenna system with two-layer stream according to one aspect of the presentation embodiments. The received data 910 illustrates the data after unnecessary data is discarded and it includes signals 902 and 903 corresponding to antenna 0 and 1 respectively. Referring now to FIG. 10A, the received data 910 is stored in a memory, e.g., SMEM 120, as stored data 1022. Referring now to FIG. 10B, sparsity of 0.5 for the stored data 1022 is shown.

Figures 11A, 11B:
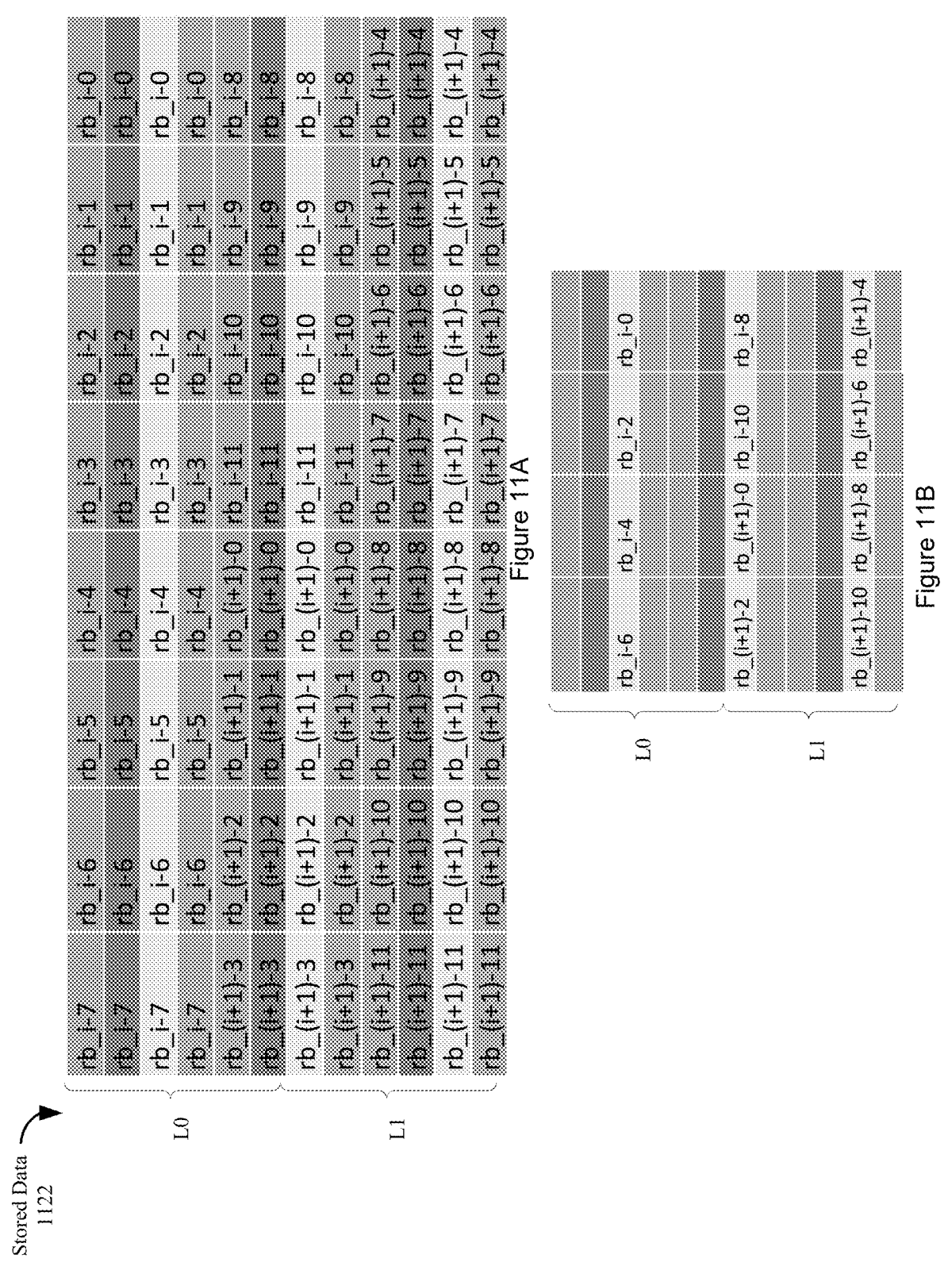

Referring now to FIG. 11A, an example of the stored data 1122 associated in an example of a system 100 with two antennas and two layers is shown. The stored data 1122 may be stored in a memory, e.g., SMEM 120. Referring now to FIG. 11B, sparsity of 0.25 for the stored data 1122 is shown.

Figures 12A, 12B, 12C:
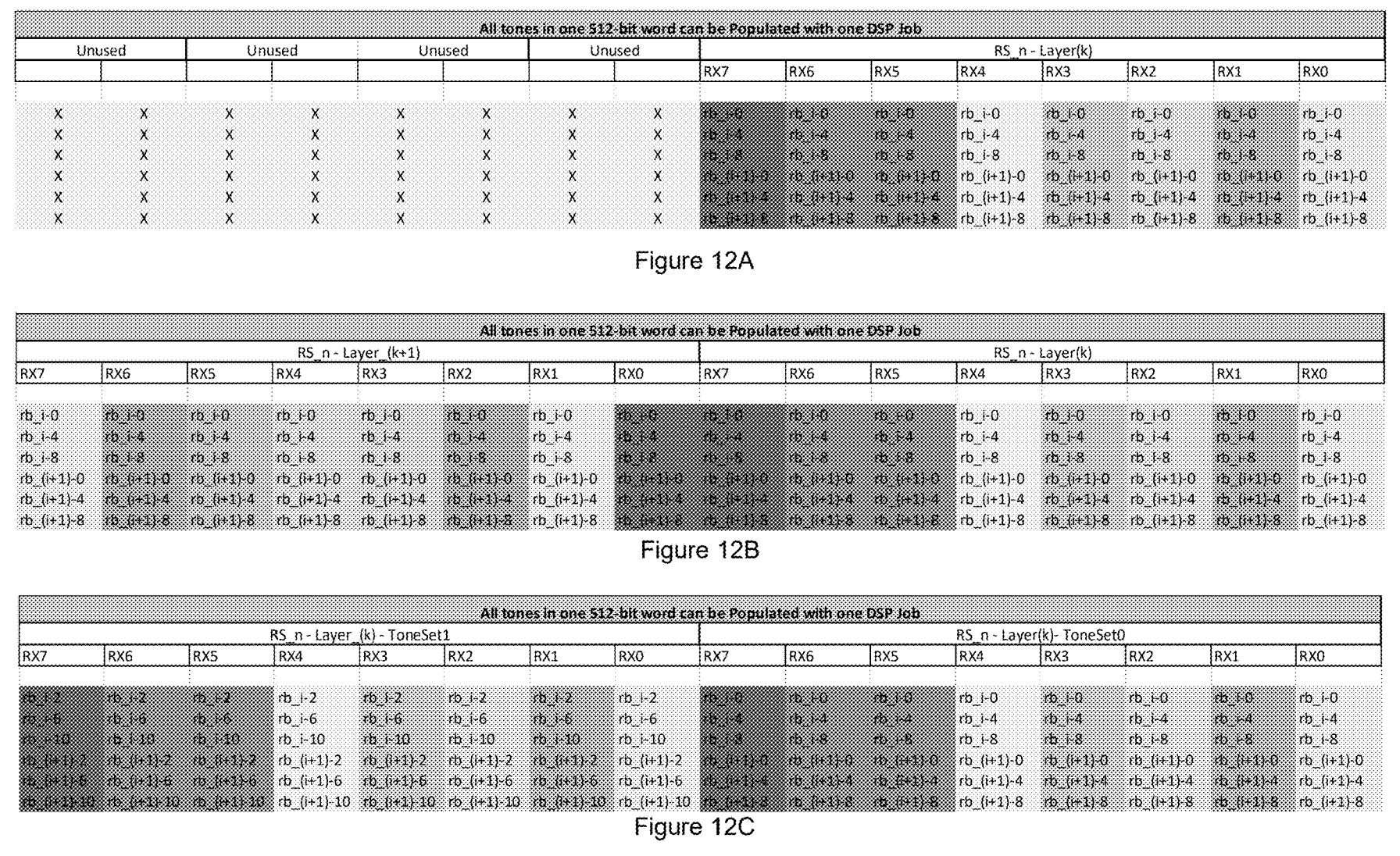

Referring now to FIG. 12A, an example of data restructured and reformatted by the conversion unit is shown. The formatted data in FIG. 12A is associated with an eight-antenna single layer with sparsity of 0.25 of FIG. 2A. Sparsity of 0.25 indicates that one out of every four resource elements are kept, e.g., rb_i–0, rb_i–4, rb_i–8, etc., where each RB includes 12 resource elements while other resource elements are discarded. Referring now to FIG. 12B, an example of data restructured and reformatted by the conversion unit in an eight-antenna system with two and four-layers and sparsity of 0.25 of FIGS. 3B and 4C are shown. Referring now to FIG. 12C, an example of data restructured and reformatted by the conversion unit in an eight-antenna system with one, two, and four layers and sparsity of 0.5 of FIGS. 2B, 3C, and 4D.

Figures 13A, 13B:
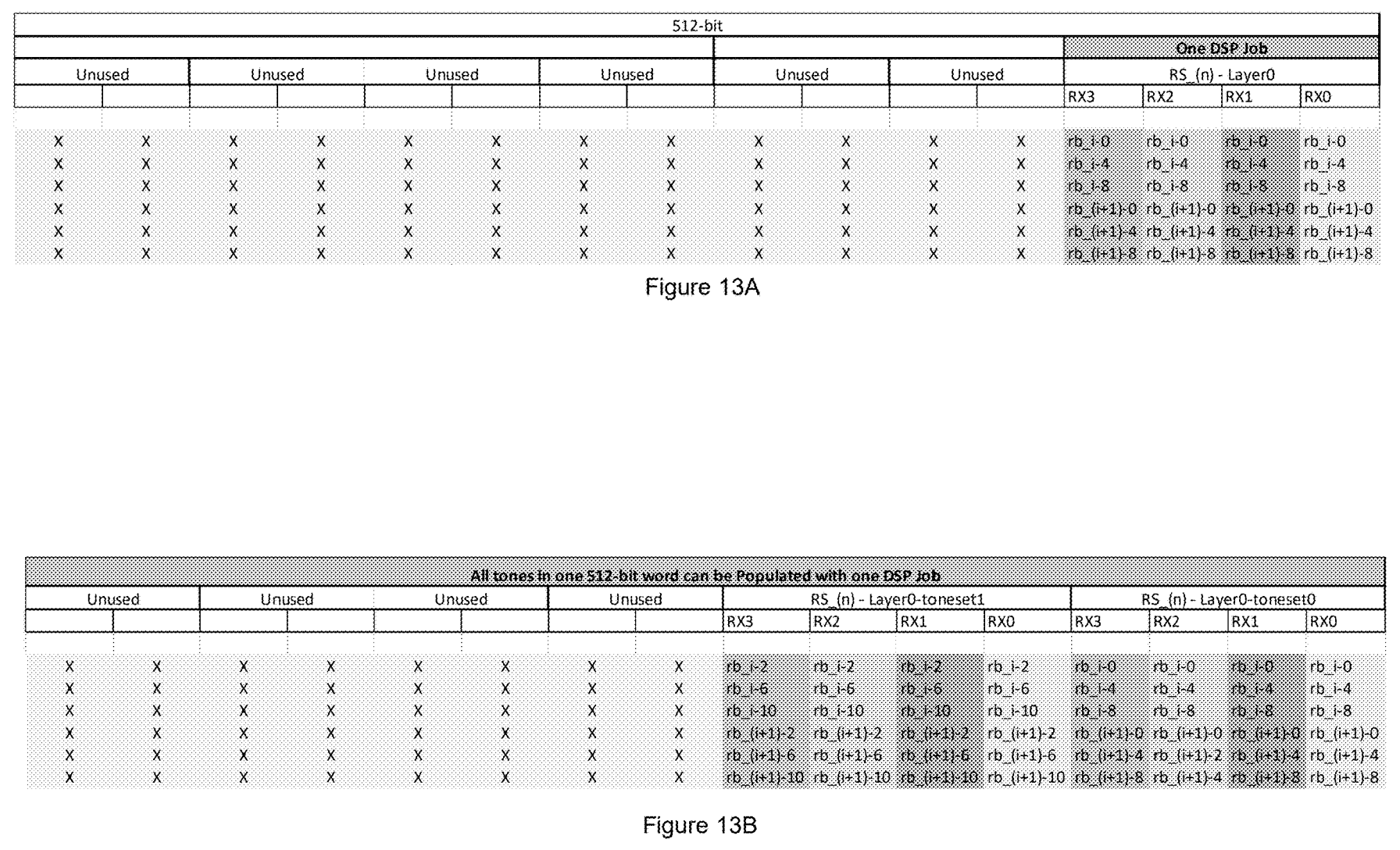
Figures 13C, 13D:
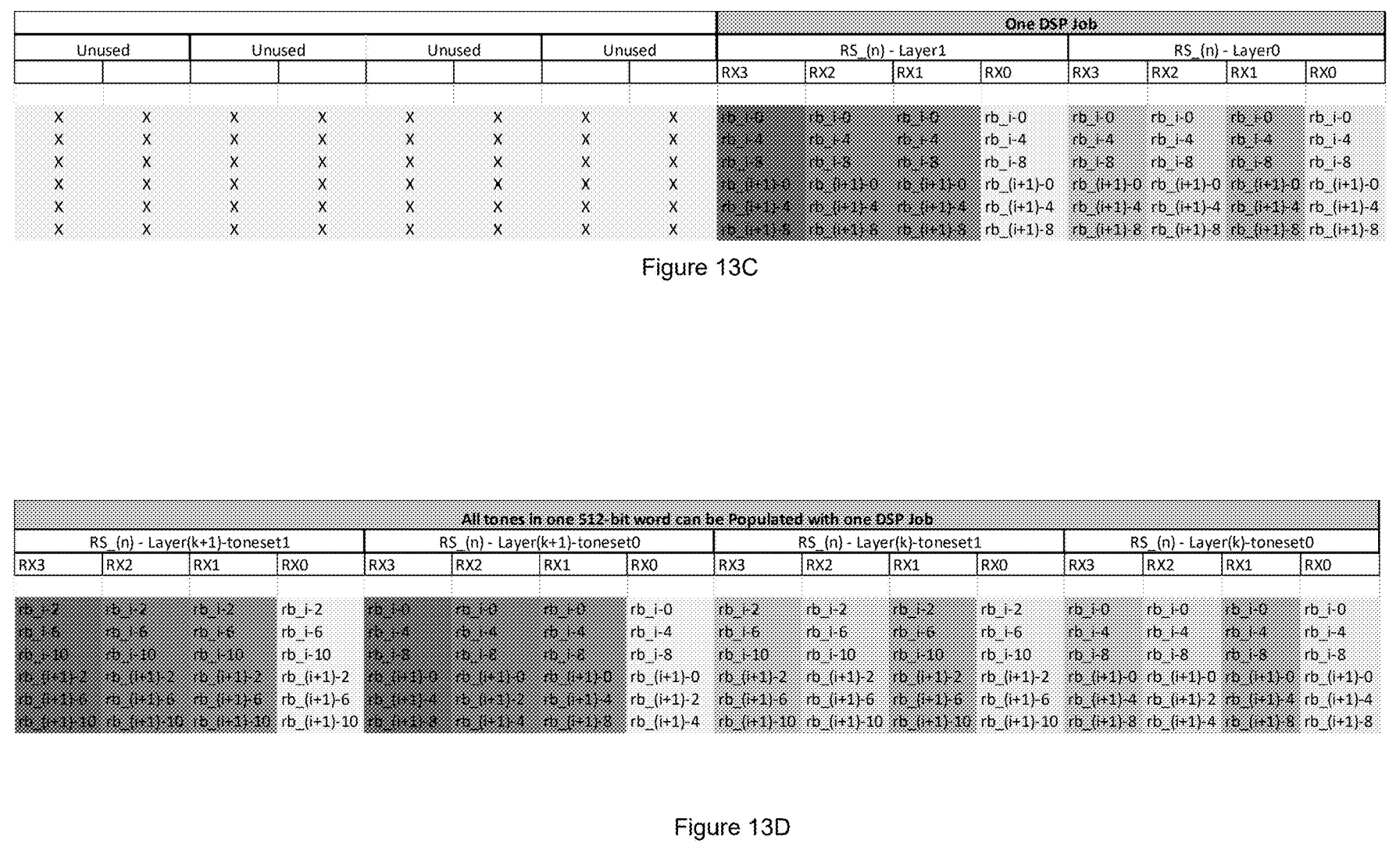
Figures 13E, 13F:
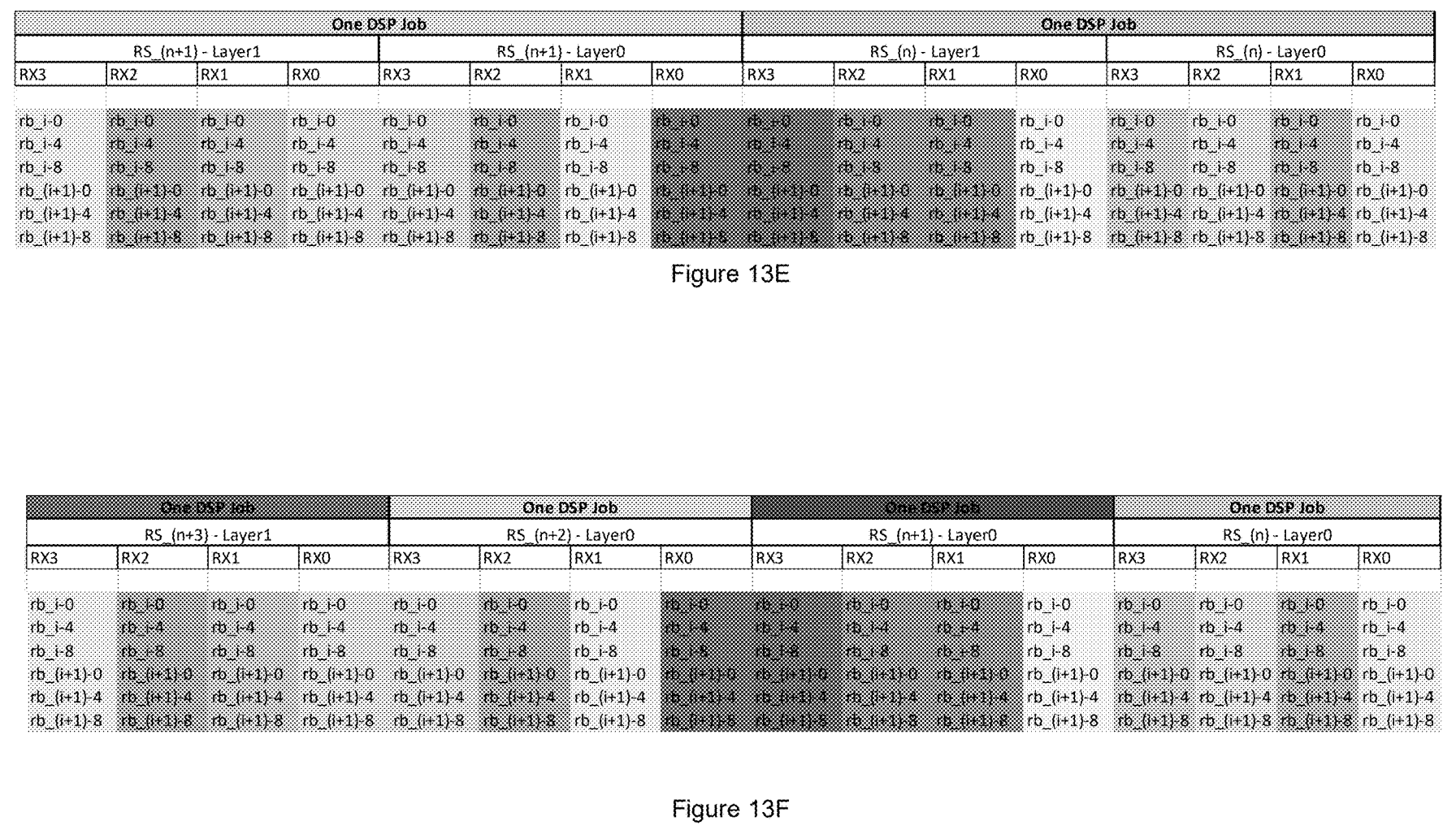
Figures 13G, 13H:
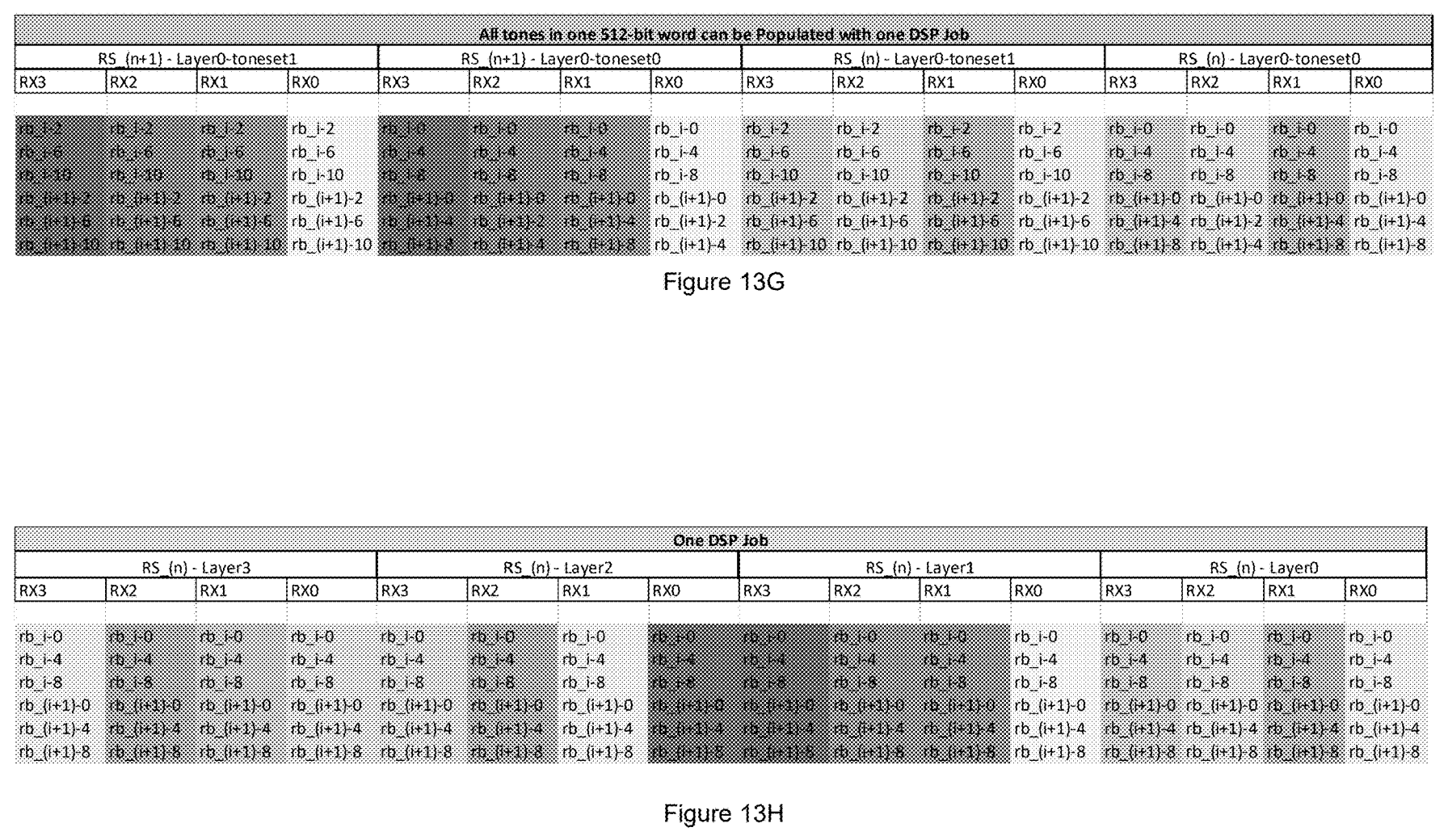

Referring now to FIG. 13A, an example of data restructured and reformatted by the conversion unit in a four-antenna single layer with sparsity of 0.25 of FIG. 6A is shown. Referring now to FIG. 13B, an example of data restructured and reformatted by the conversion unit in a four-antenna system with one layer and sparsity of 0.50 of FIG. 6B is shown. Referring now to FIG. 13C, an example of data restructured and reformatted by the conversion unit in a four-antenna two-layer with sparsity of 0.25 of FIG. 7B is shown. Referring now to FIG. 13D, an example of data restructured and reformatted by the conversion unit in a four-antenna system with two or four layers and sparsity of 0.50 of FIGS. 7C and 8B are shown. Referring now to FIG. 13E, an example of data restructured and reformatted by the conversion unit in a four-antenna two-layer with sparsity of 0.25 of FIG. 7B is shown. Referring now to FIG. 13F, an example of data restructured and reformatted by the conversion unit in a four-antenna system with one layer and sparsity of 0.25 of FIG. 6A is shown. Referring now to FIG. 13G, an example of data restructured and reformatted by the conversion unit in a four-antenna one-layer with sparsity of 0.50 of FIG. 6B is shown. Referring now to FIG. 13H, an example of data restructured and reformatted by the conversion unit in a four-antenna system with four-layer and sparsity of 0.25 is shown.

Figures 14A, 14B:
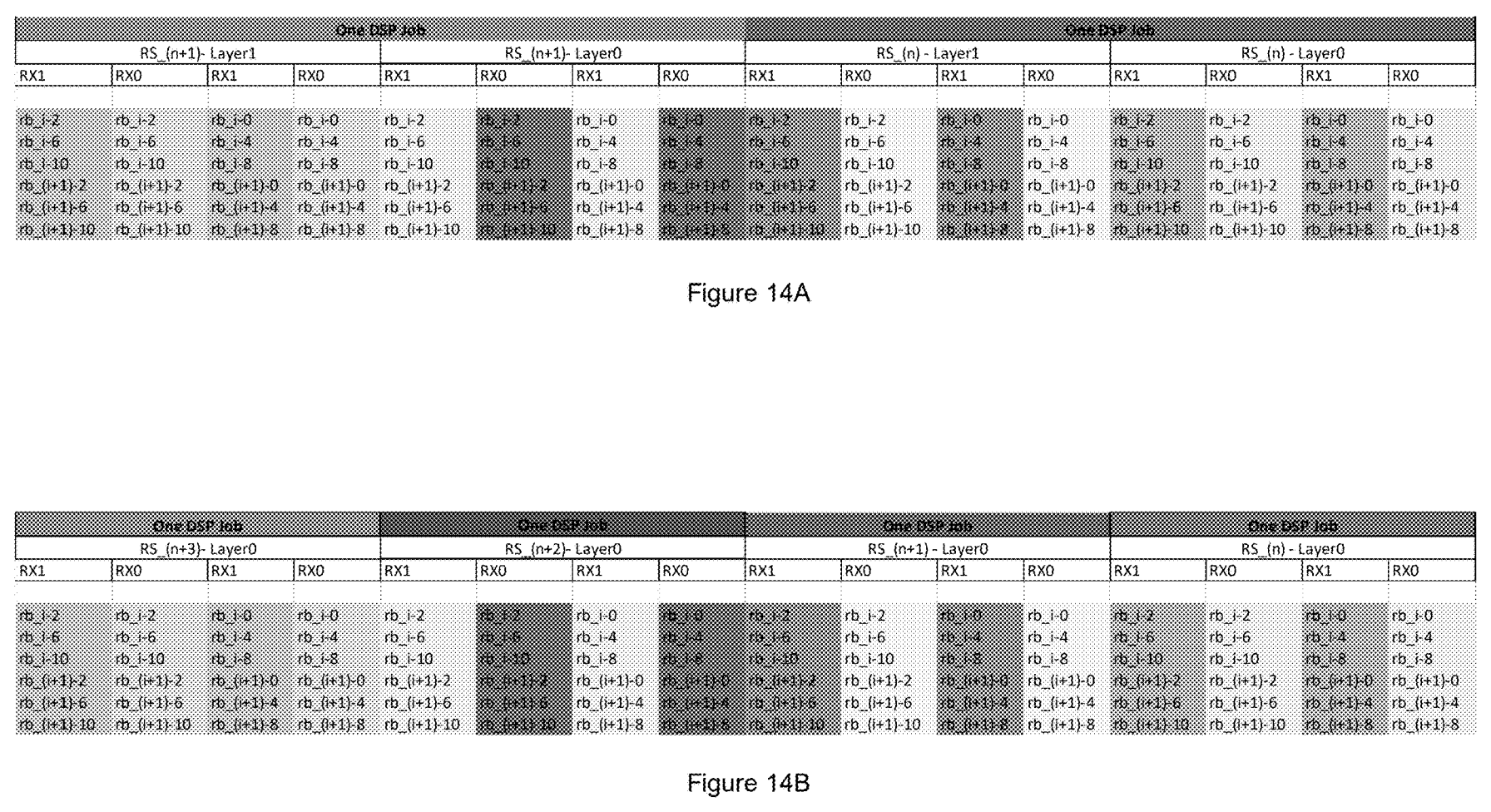

Referring now to FIG. 14A, an example of data restructured and reformatted by the conversion unit in a two-antenna two-layer with sparsity of 0.50 of FIG. 10B is shown. Referring now to FIG. 14B, an example of data restructured and reformatted by the conversion unit in a two-antenna one-layer with sparsity of 0.50 is shown.

Figures 15A, 15B:
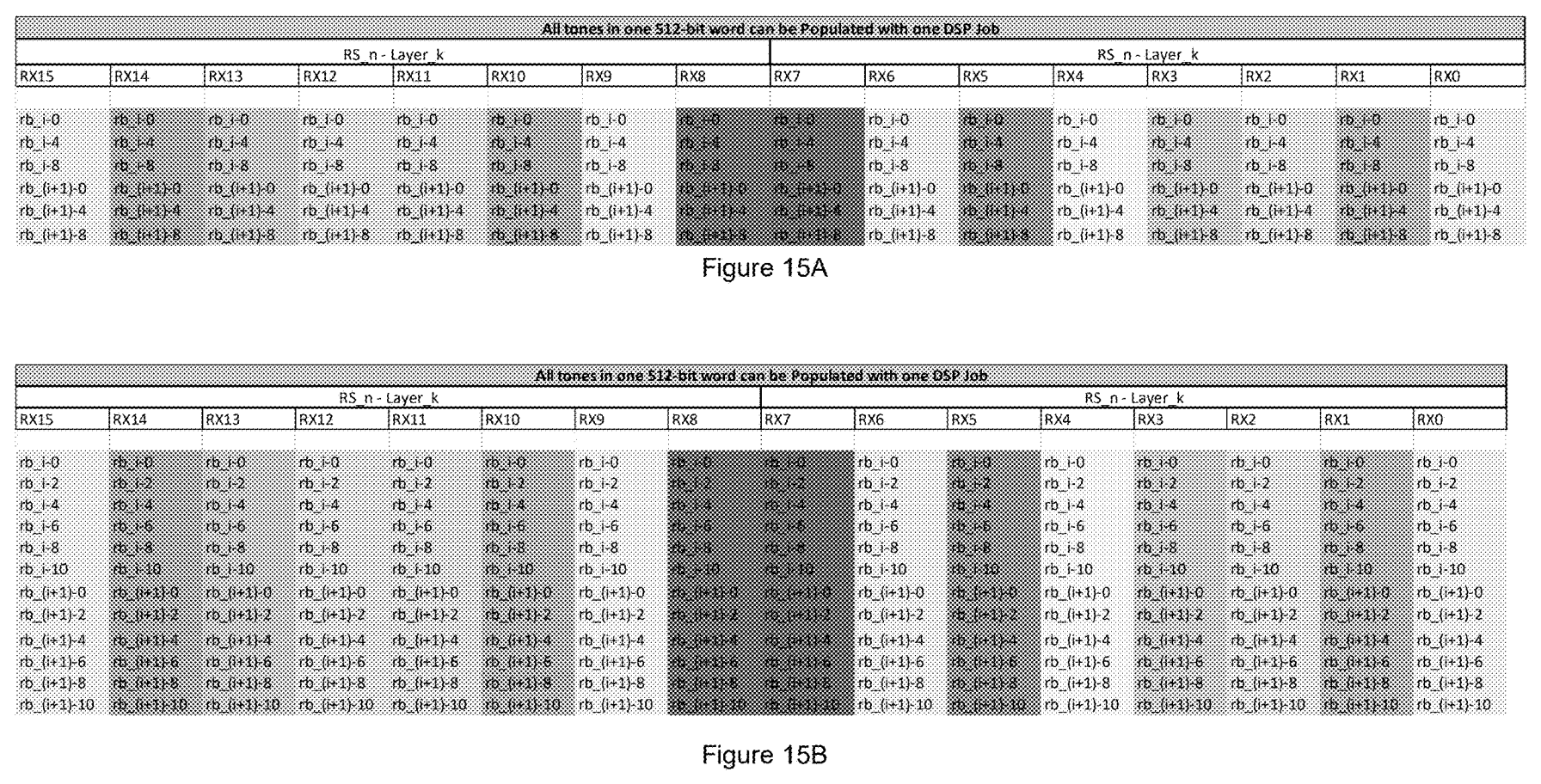

Referring now to FIG. 15A, an example of data restructured and reformatted by the conversion unit in a sixteen-antenna with 8/4/2/1-layers with 0.25 sparsity is shown. Referring now to FIG. 15B, an example of data restructured and reformatted by the conversion unit in a sixteen-antenna with 8/4/2/1-layers with 0.50 sparsity is shown.

Figure 16:
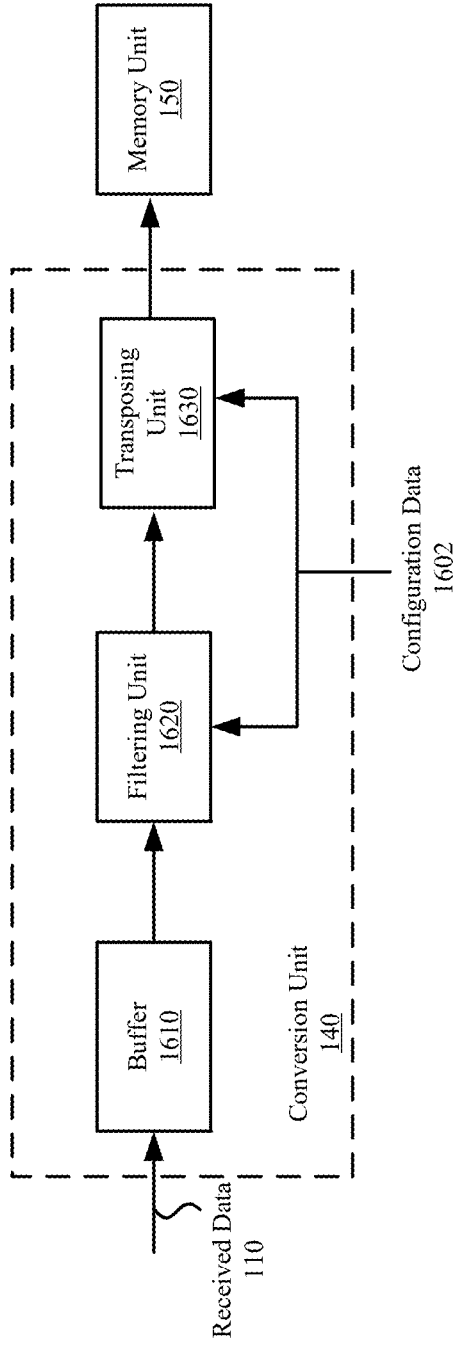
FIG. 16 depicts an example of a device for restructuring data according to one aspect of the present embodiments.

FIG. 16 depicts an example of a device 140 for restructuring data according to one aspect of the present embodiments. The conversion unit 140 may include a buffer 1610, a filtering unit 1620, and a transposing unit 1630 that is coupled to the memory unit 150. It is appreciated that the stored data in SMEM 120 or a DRAM is read and stored in the buffer 1610, e.g., top first in first out (FIFO). It is appreciated that in one nonlimiting example additional FIFO may be used to absorb data popped from the read DMA FIFO and to transfer the data as 128-bit, burst length 1 transfer. According to some embodiments, the data from the buffer 1610 is sent to the filtering unit 1620 to discard the unnecessary data (if not done already) and/or to perform filtering based on sparsity, e.g., 0.25, 0.50, etc., as described in FIGS. 2A-11B. For example, the configuration data 1602 may be received by the filtering unit 1620 to indicate the sparsity. The output of the filtering unit 1620 may be sent to the transposing unit 1630. The transposing unit 1630 is configured to transpose the stored data in a fashion that is described in FIGS. 1A-1B and 12A-15B depending on the number of antennas, the number of layers, the sparsity, etc., as indicated by the configuration data 1602. The formatted data is stored in the memory unit 150 such that it can be fetched by the processing unit 160, e.g., FDEQ. It is appreciated that the configuration data 1602 may be written by a DSP before each DMA job. In one nonlimiting example, the data is accumulated in the memory 150, e.g., PMEM, to produce pairs of 128 bit, burst length 1 transfers which are 256 bit aligned. In one nonlimiting example, the storing of the data into the memory 150 is in bursts and arbitrated by an arbiter, to manage shared access to the memory 150.

It is appreciated that the conversion unit 140 of FIG. 16 supports a single job operation (DMA operation). The input data stream for the conversion unit 140 may be 128 bits and the conversion unit 140 may support a burst length of 1 at a maximum rate of one data transfer at every clock cycle. The output of the conversion unit 140 is a 128 bit with burst length of 1 at a maximum rate of one data transfer every clock cycle.

Figure 17:
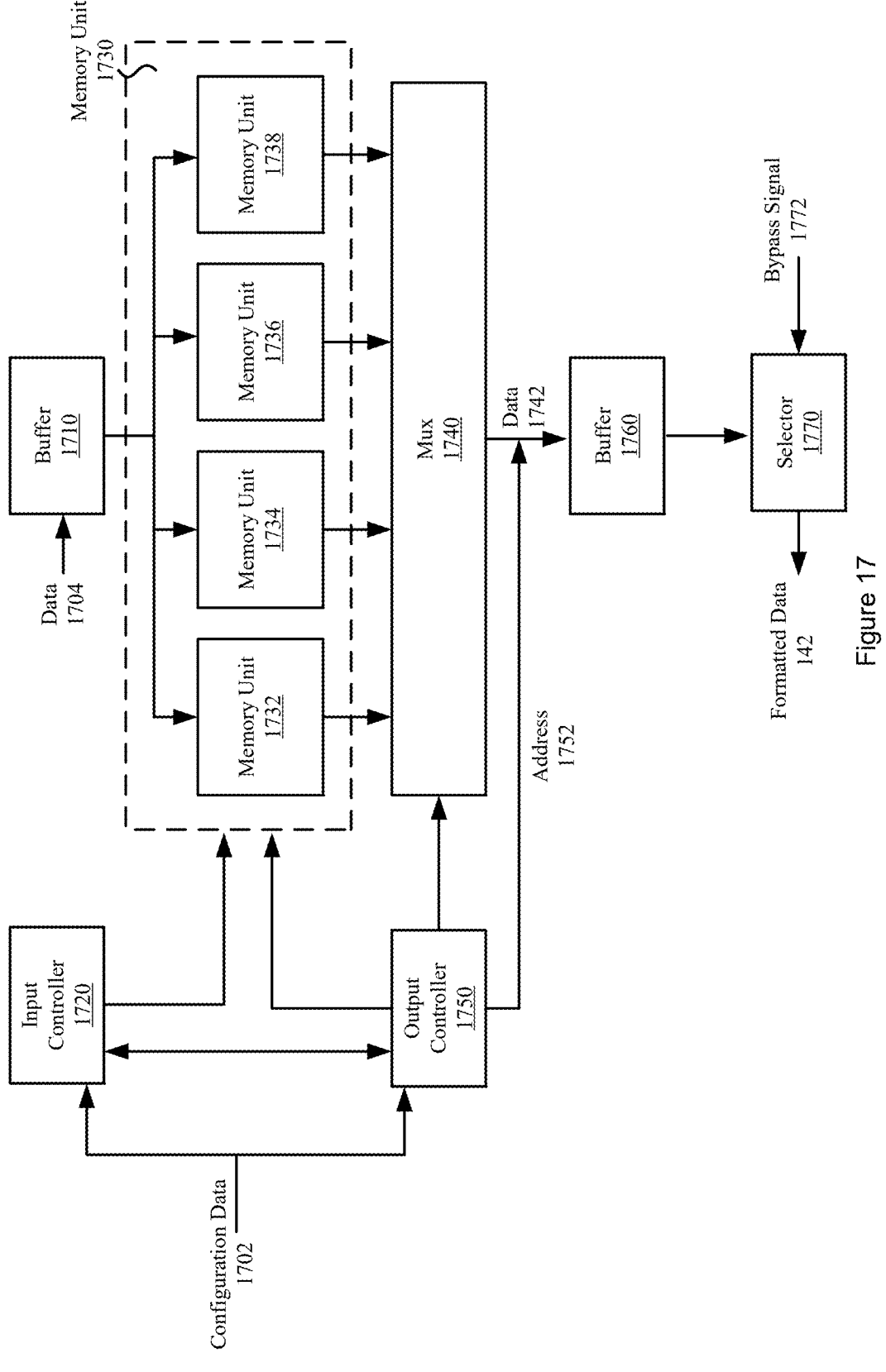
FIG. 17 depicts another example of a conversion unit for restructuring data according to one aspect of the present embodiments.

FIG. 17 depicts another example of a conversion unit 140 for restructuring data according to one aspect of the present embodiments. According to some embodiments, the conversion unit 140 may include a buffer 1710, a memory unit 1730, input controller 1720, output controller 1750, a mux 1740, a buffer 1760, and a selector 1770. The buffer 1710 is configured to receive data 1704, which may be the received data after the unnecessary data is discarded and/or after filtering based on the indicated sparsity. The buffer 1710 supports a 128-bit wide writes using burst length 1 and a maximum rate of data of 1 transfer per clock cycle. The formatted data 142 generated by the conversion unit 140 may also support a 128-bit wide writes using burst length 1 with the same maximum rate. It is appreciated that the data 1704 is the valid data that is received (e.g., after unnecessary data is discarded). As described above, the received data 1704 is transposed by the conversion unit 140. In some embodiment, the reorganization of data occurs as the data is being written into internal buffers.

It is appreciated that the transposed data may be buffered into predefined alignments in each buffer being read out as output data. As described above, the system may include 12 RBs and each RB may include 32-bit resource elements per antenna layer. In one nonlimiting example, the memory unit 1730 may include four memory units 1732-1738. For example, the memory unit 1732 is associated with resource element modulo 3 for a 128-bit wide data, the memory unit 1734 is associated with resource element modulo 2 for a 128-bit wide data, the memory unit 1736 is associated with resource element modulo 1 for a 128-bit wide data, and the memory unit 1738 is associated with resource element modulo 0 for a 128-bit wide data. In other words, the 128-bit wide data associated with data 1704 is divided into four 32-bit resource elements and stored in each respective memory units 1732-1738. It is appreciated that the resource elements are split across the memory units 1732-1738 and the data is groups within each memory by antenna order for each layer. In this nonlimiting example, the memory partition (memory units 1732-1738) works across RBs since an RB length is 12 resource elements which may be evenly divided by the four memory units 1732-1738. It is appreciated that as data arrives, e.g., data 1704, a 128-bit transfer belonging to the same RB within a single layer of antenna may occur. The write addressing into the four memory units 1732-1738 operate with modulo 4 across the memories to either write resource element sets {0, 1, 2, 3}, {4, 5, 6, 7}, or {8, 9, 10, 11} that is repeated for each antenna and layer. It is appreciated that through memory write enables, 32-bit resource element data is written into the correct transpose position (as described above), 32-bit lane within 128-bit word. According to one nonlimiting example, the transposed data is ordered such that resource elements are interleaved across antenna and layers. As such, writing resource elements into this interleaved format across antenna and layers enables a single 128-bit read to fetch a full transfer of output data in a single clock cycle. It is appreciated that according to some embodiments, sparsity may be applied either before transposing the data or after.

It is appreciated that according to one nonlimiting example, configuration data 1702 (e.g., number of antennas, number of layers, sparsity, etc.) may be sent to the input controller 1720 and the output controller 1750. The input controller 1720 may control data movement into the memory unit 1730 and transposing the data, as described above, based on the configuration data 1702. In one nonlimiting example, data movement out of the memory unit 1730 may be controlled by the output controller 1750 based on the configuration data 1702. It is appreciated that the data is output from each memory units 1732-1738 into the mux 1740 and output flow of the appropriate data from the mux 1740 is controlled by the output controller 1750. The output controller 1750 may also transmit the address 1752 (based on fetching four resource elements per clock cycle to build a 128-bit output) to the buffer 1760 when data 1742 is being transmitted. Data 1742 may be accumulated in the buffer 1760 and sent to the selector 1770. It is appreciated that the output may be a 128-bit wide data for each clock cycle that outputs from one of the four memory units 1732-1738 or may output 64-bit wide data from two of the memory units from the memory units 1732-1738. The selector 1770 is configured to output the data the formatted data 142. In one nonlimiting example, the selector 1770 may receive a bypass signal 1772 indicating that no filtering of the data is to be performed and the input data, e.g., data 1704, is directly output without being formatted. However, if the bypass signal 1772 is de-asserted, the selector 1770 may filter out data based on the indicated sparsity through the configuration data 1702. It is appreciated that the formatted data 142 may be stored in the memory unit so that it can be fetched by the processing unit 160, when needed.

It is appreciated that in one nonlimiting example, in order to support the data rate on both the input and output of the conversion unit 140, the size of the memory units 1732-1738 may be doubled in order to facilitate a ping-pong read/write operation. In other words, each of the memory units 1732-1738 may be split into two buffers, where one buffer is being written by the input while the other buffer is being read to produce the output. In one nonlimiting example, after reset, both buffers are owned by the input until the first buffer is filled at which point the ownership is transferred to the output. The input continues writing but into the second buffer while the output reads data from the first buffer.

According to some embodiments, the memory buffering may be sized based on the following constraints:

32 bits/resource element*8 resource elements/
(2*128) bit transfer*8 antenna/buffer*2 ping-
pong buffers=4096 bits.

In one nonlimiting example, partitioning 4096 bits into 4 memories is 1024 bits/memory and since there are 128 bits/row, then there are 8 rows. As such, four (8*128) bit memories may be needed. In one nonlimiting example, since 8 rows is less than the recommended minimum of 32 rows for random access memory (RAM), the memory units 1732-1738 may be implemented in FLOPs.

Figure 18:
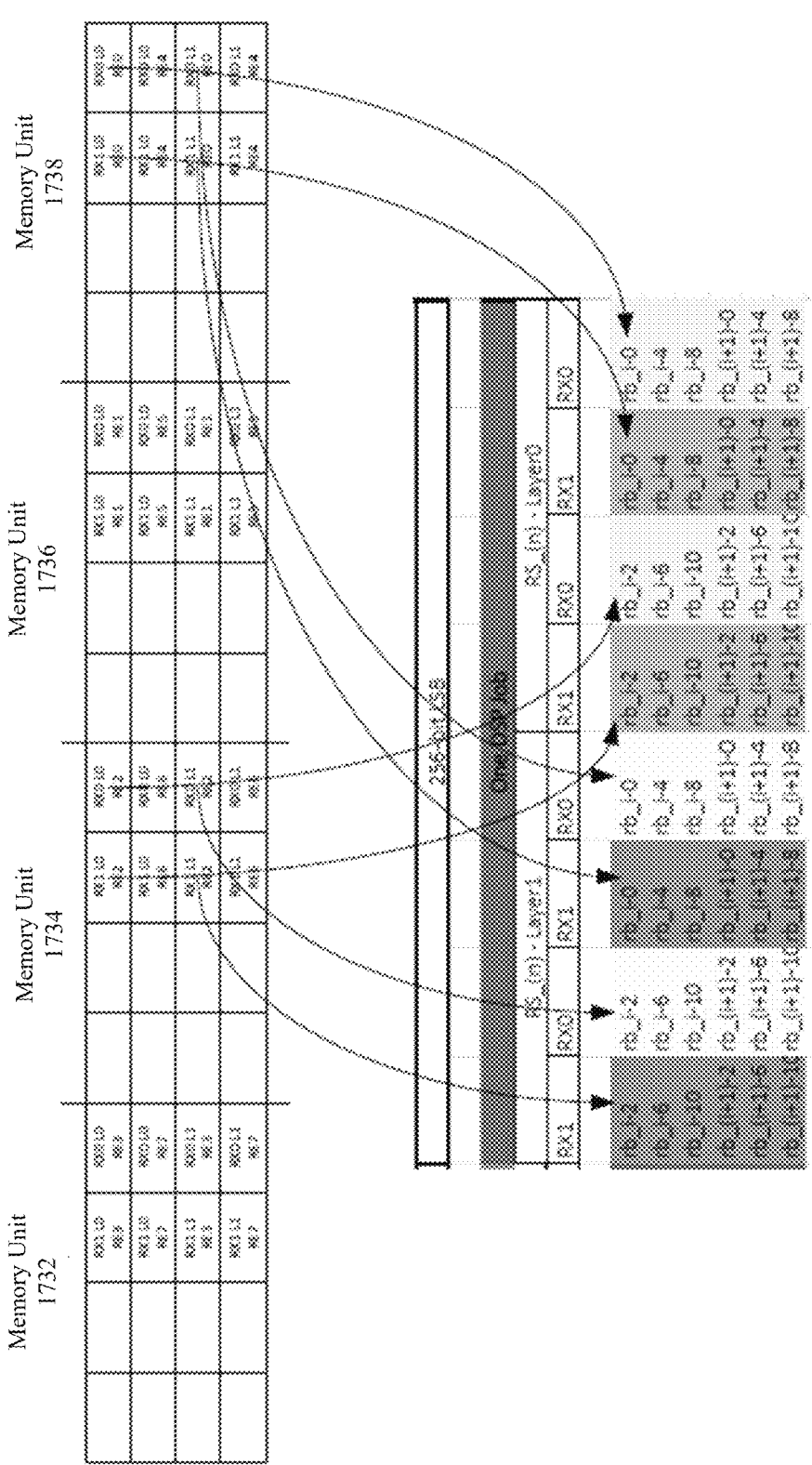
FIG. 18 depicts an example of mapping buffer data for the conversion unit to the output format for a two-antenna, two-layer, with sparsity of 0.5 according to one aspect of the present embodiments.

Referring now to FIG. 18, an example of mapping buffer data for the conversion unit to the output format for a two-antenna, two-layer, with sparsity of 0.5 according to one aspect of the present embodiments is shown. In this non-limiting example, the buffer is only half filled since the system has two antennas with two layers. In this example, RO and RI are associated with the first and the second antennas respectively and L0 and L1 refer to the layers. Resource elements are designated as RE where n is the repeating order between 0 and 11 within a particular antenna and layer. It is appreciated that in this example, only half of the valid data from the buffer is copied to the output since sparsity is 0.5. As an example, a start resource element index is 0 and the data from even number RE are copied and the odd numbers are unused. In this nonlimiting example, two 64-bit reads are performed in parallel to memory units 1738 and 1734 followed by two more 64-bit reads to the same memories to build a pair of 128-bit output words. It is appreciated that job column 0 aligns the data to the least significant bit position in the 512-bit word. It is appreciated that the generated formatted data may not be in ascending order throughout a filtering job, e.g., configurations with large antenna/layers the output address may jump backwards for multiple passes to fill the required data format.

Figure 19:
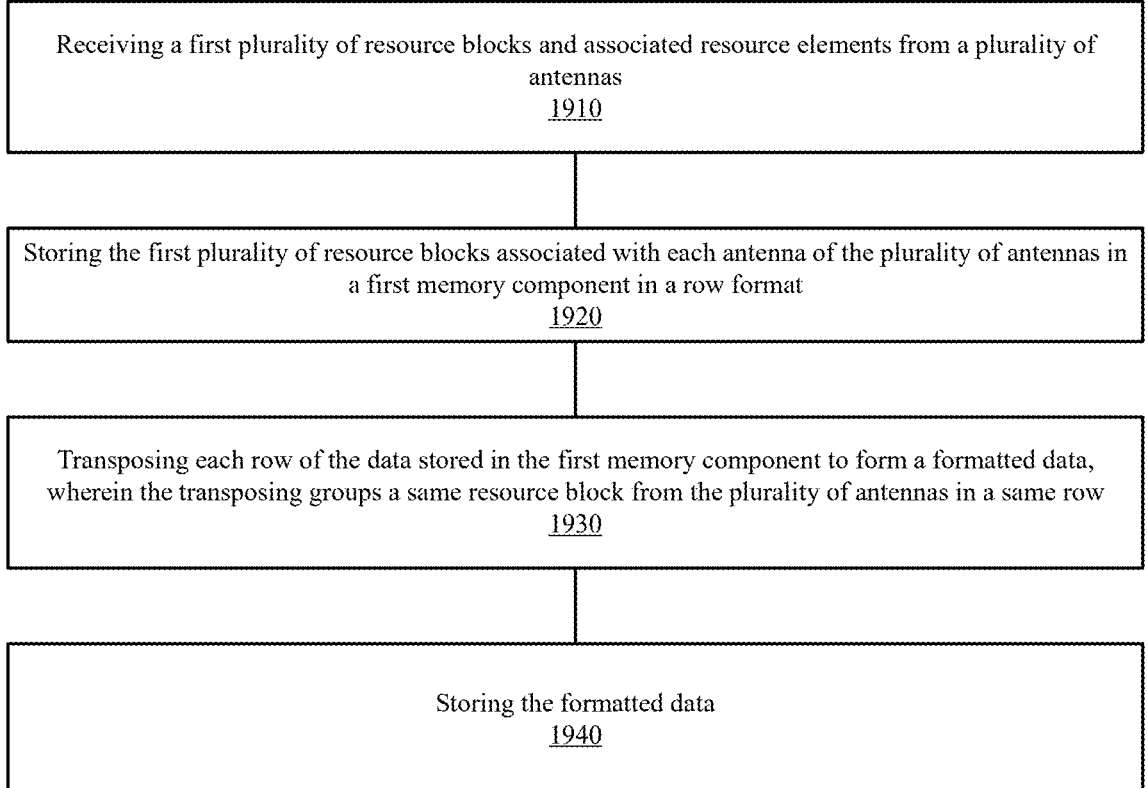
FIG. 19 depicts an illustrative flow diagram for converting received data from a first format to a second format according to one aspect of the present embodiments.

FIG. 19 depicts an illustrative flow diagram for converting received data from a first format to a second format according to one aspect of the present embodiments. At step 1910, a first plurality of resource blocks and associated resource elements from a plurality of antennas is received. At step 1920, the first plurality of resource blocks associated with each antenna of the plurality of antennas is stored in a first memory component in a row format. At step 1930, each row of the data stored in the first memory component is transposed to form a formatted data, wherein the transposing groups a same resource block from the plurality of antennas in a same row. At step 1940, the formatted data is stored.

In some embodiments, the method may further include storing the first plurality of resource blocks associated with a different layer with the each antenna of the plurality of antennas in the first memory component in a row format. It is appreciated that data associated with different layers are stored in different rows. In one nonlimiting example, the method also includes receiving a second plurality of resource blocks and associated resource elements from the plurality of antennas. The received second plurality of resource blocks are stored in the first memory component in a row format. It is appreciated that the second plurality of resource blocks is stored in a different row than that of the first plurality of resource blocks. In one nonlimiting example, a subset of resource blocks of the first plurality of resource blocks is filtered out based on a sparsity value. The filtering based on sparsity may occur subsequent to transposing the data. In one nonlimiting example, the formatted data is fetched and used by the processing unit in a row fashion. It is appreciated that in some embodiments, unnecessary data may be discarded from a received data to leave the first plurality of resource blocks. It is appreciated that the unnecessary data includes use equipment data, data associated with generated reference signal, and data associated with received reference signal to generate.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A system, comprising:
   a first memory unit configured to store a subset of a data, wherein the data is received by a plurality of antennas, wherein the subset of the data is stored in a first format, wherein in the first format a first plurality of rows is associated with a layer for the plurality of antennas, wherein each row of the first plurality of rows is associated with the layer of an antenna of the plurality of antennas and includes a plurality of resource blocks and associated plurality of resource elements and wherein the plurality of resource blocks is associated with the received data,
   a conversion unit configured to receive the subset of data from the first memory in the first format and to change a format of the subset of data from the first format to a second format, wherein in the second format a same resource block of the plurality of resource blocks of the subset of the data received by the plurality of antennas is arranged in a same row to group the same resource block of the plurality of resource blocks together and to form a formatted data; and
   a second memory unit configured to store the formatted data.

2. The system of claim 1, wherein in the first format a second plurality of rows is associated with another layer for the plurality of antennas, and wherein each row of the second plurality of rows is associated with the another layer of the plurality of antennas and includes the plurality of resource blocks and associated plurality of resource elements.

3. The system of claim 1 further comprising a filtering unit configured to filter out a subset of resource blocks of the plurality of resource blocks based on a sparsity value.

4. The system of claim 3, wherein the filtering occurs subsequent to the subset of data being formatted from the first format to the second format.

5. The system of claim 1, wherein changing the first format to the second format includes transposing at least a portion of the subset of data.

6. The system of claim 1 further comprising a processing unit configured to fetch the formatted data from the second memory in a row fashion.

7. The system of claim 6, wherein the processing unit is a frequency domain equalizer and wherein the processing unit is configured to process the same resource block from the plurality of antennas that is fetched in the row fashion.

8. The system of claim 1 further comprising a filtering unit configured to discard unnecessary data from the data, wherein the unnecessary data includes use equipment data, data associated with generated reference signal, and data associated with received reference signal to generate.

9. The system of claim 8, wherein the subset of data remains subsequent to the filtering unit discarding the unnecessary data.

10. A system, comprising:

a plurality of antennas configured to receive data communicated wirelessly;

a first memory component configured to store a first plurality of resource blocks and associated resource elements for the received data associated with a first antenna of the plurality of antennas in a first row of the first memory component, and wherein the first memory component is further configured to store the first plurality of resource blocks for a second antenna of the plurality of antennas in a second row of the first memory component;

a conversion unit configured to receive the stored first plurality of resource blocks and associated resource elements from the first memory component and format the stored first plurality of resource blocks and associated resource elements to arrange a first resource block of the first plurality of resource blocks from the first and the second antennas in a same row to form a formatted data; and a second memory component configured to store the formatted data.

11. The system of claim 10, wherein the first memory component is further configured to store the first plurality of resource blocks associated with a different layer for the first antenna in a row different from the first and the second row.

12. The system of claim 11, wherein the conversion unit is configured to format the stored first plurality of resource blocks associated with the different layer for the first antenna to arrange a same resource block of the first plurality of resource blocks associated with the different layer in one row.

13. The system of claim 10, wherein the first memory component is configured to store a second plurality of resource blocks and associated resource elements for the received data associated with the first antenna of the plurality of antennas in a third row of the first memory component, and wherein the first memory component is further configured to store the second plurality of resource blocks for the second antenna of the plurality of antennas in a fourth row of the first memory component.

14. The system of claim 13, wherein the conversion unit is configured to receive the stored second plurality of resource blocks and associated resource elements from the first memory component and format the stored second plurality of resource blocks and associated resource elements to arrange a second resource block of the second plurality of resource blocks from the first and the second antennas in another row to form the formatted data.

15. The system of claim 10 further comprising a filtering unit configured to filter out a subset of resource blocks of the first plurality of resource blocks based on a sparsity value.

16. The system of claim 15, wherein the filtering occurs subsequent to formatting by the conversion unit.

17. The system of claim 10, wherein the conversion unit is configured to transpose the first row and transpose the second row to form the formatted data.

18. The system of claim 10 further comprising a processing unit configured to fetch the formatted data from the second memory in a row fashion.

19. The system of claim 18, wherein the processing unit is a frequency domain equalizer and wherein the processing unit is configured to process the first resource block from the plurality of antennas that is fetched in the row fashion.

20. The system of claim 10 further comprising a filtering unit configured to discard unnecessary data from the data, wherein the unnecessary data includes use equipment data, data associated with generated reference signal, and data associated with received reference signal to generate.

21. The system of claim 20, wherein the first plurality of resource blocks remains subsequent to the filtering unit discarding the unnecessary data.

\* \* \* \* \*